United States Patent

Davis

(10) Patent No.: US 9,523,805 B2
(45) Date of Patent: Dec. 20, 2016

(54) FINE PITCH WIRE GRID POLARIZER

(71) Applicant: Moxtek, Inc., Orem, UT (US)

(72) Inventor: Mark Davis, Springville, UT (US)

(73) Assignee: Moxtek, Inc., Orem, UT (US)

( * ) Notice: Subject to any disclaimer, the term of this patent is extended or adjusted under 35 U.S.C. 154(b) by 583 days.

(21) Appl. No.: 14/035,478

(22) Filed: Sep. 24, 2013

(65) Prior Publication Data

US 2014/0016197 A1    Jan. 16, 2014

Related U.S. Application Data

(63) Continuation of application No. 13/224,719, filed on Sep. 2, 2011, now Pat. No. 8,611,007.

(60) Provisional application No. 61/384,796, filed on Sep. 21, 2010, provisional application No. 61/384,802, filed on Sep. 21, 2010.

(51) Int. Cl.
*G02B 5/30* (2006.01)
*B82Y 20/00* (2011.01)

(52) U.S. Cl.
CPC ............ *G02B 5/3058* (2013.01); *B82Y 20/00* (2013.01); *Y10T 428/2457* (2015.01)

(58) Field of Classification Search
CPC ........... G02B 5/30; G02B 5/18; G02B 5/3058; G02B 5/1814; G03F 7/00; G03F 1/00; H01B 13/00; B29D 11/00; B32B 3/28; B82Y 20/00; Y10T 428/2457
USPC ............. 359/486, 485.05, 487.03, 352, 576; 430/311, 321; 216/13, 24; 977/902; 428/167
See application file for complete search history.

(56) References Cited

U.S. PATENT DOCUMENTS

| | | |
|---|---|---|
| 2,224,214 A | 12/1940 | Brown |
| 2,287,598 A | 6/1942 | Brown |
| 2,887,566 A | 5/1955 | Marks |
| 2,748,659 A | 6/1956 | Geffcken et al. |
| 3,046,839 A | 7/1962 | Bird et al. |
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,479,168 A | 11/1969 | Bird et al. |
| 3,536,373 A | 10/1970 | Bird et al. |
| 3,653,741 A | 4/1972 | Marks |

(Continued)

FOREIGN PATENT DOCUMENTS

| | | |
|---|---|---|
| AU | 2003267964 | 12/2003 |
| CN | 1692291 | 11/2005 |

(Continued)

OTHER PUBLICATIONS

Auton et al, "Grid Polarizers for Use in the Near Infrared." Infrared Physics, 1972, vol. 12, pp. 95-100.

(Continued)

*Primary Examiner* — Thomas K Pham
*Assistant Examiner* — Jie Lei
(74) *Attorney, Agent, or Firm* — Thorpe, North & Western, LLP

(57) ABSTRACT

A wire grid polarizer can have a repeated pattern of groups of parallel elongated wires disposed over a substrate. Each group of wires can comprise at least three wires. At least one wire at an interior of each group can be taller than outermost wires of each group. The wires can be a byproduct of an etch reaction.

19 Claims, 12 Drawing Sheets

(56) References Cited

U.S. PATENT DOCUMENTS

| | | |
|---|---|---|
| 3,877,789 A | 4/1975 | Marie |
| 3,969,545 A | 7/1976 | Slocum |
| 4,009,933 A | 3/1977 | Firester |
| 4,049,944 A | 9/1977 | Garvin et al. |
| 4,068,260 A | 1/1978 | Ohneda et al. |
| 4,220,705 A | 9/1980 | Sugibuchi et al. |
| 4,289,381 A | 9/1981 | Garvin et al. |
| 4,456,515 A | 6/1984 | Krueger et al. |
| 4,512,638 A | 4/1985 | Sriram et al. |
| 4,514,479 A | 4/1985 | Ferrante |
| 4,515,441 A | 5/1985 | Wentz |
| 4,763,972 A | 8/1988 | Papuchon et al. |
| 4,799,776 A | 1/1989 | Yamazaki et al. |
| 4,818,076 A | 4/1989 | Heppke et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,061,050 A | 10/1991 | Ogura |
| 5,124,841 A | 6/1992 | Oishi |
| 5,157,526 A | 10/1992 | Kondo et al. |
| 5,177,635 A | 1/1993 | Keilmann |
| 5,225,920 A | 7/1993 | Kasazumi et al. |
| 5,235,449 A | 8/1993 | Imazeki et al. |
| 5,245,471 A | 9/1993 | Iwatsuka et al. |
| 5,279,689 A | 1/1994 | Shvartsman |
| 5,383,053 A | 1/1995 | Hegg et al. |
| 5,422,756 A | 6/1995 | Weber |
| 5,510,215 A | 4/1996 | Prince et al. |
| 5,559,634 A | 9/1996 | Weber |
| 5,619,356 A | 4/1997 | Kozo et al. |
| 5,748,368 A | 5/1998 | Tamada et al. |
| 5,838,403 A | 11/1998 | Jannson et al. |
| 5,890,095 A | 3/1999 | Barbour et al. |
| 5,912,762 A | 6/1999 | Li et al. |
| 5,973,833 A | 10/1999 | Booth et al. |
| 5,991,075 A | 11/1999 | Katsuragawa et al. |
| 6,081,376 A | 6/2000 | Hansen et al. |
| 6,122,103 A | 9/2000 | Perkins et al. |
| 6,208,463 B1 | 3/2001 | Hansen et al. |
| 6,234,634 B1 | 5/2001 | Hansen et al. |
| 6,243,199 B1 | 6/2001 | Hansen et al. |
| 6,251,297 B1 | 6/2001 | Komuro et al. |
| 6,288,840 B1 | 9/2001 | Perkins et al. |
| 6,291,797 B1 | 9/2001 | Koyama et al. |
| 6,424,436 B1 | 7/2002 | Yamanaka |
| 6,426,837 B1 | 7/2002 | Clark et al. |
| 6,496,239 B2 | 12/2002 | Seiberle |
| 6,514,674 B1 | 2/2003 | Iwasaki |
| 6,532,111 B2 | 3/2003 | Kurtz et al. |
| 6,654,168 B1 | 11/2003 | Borrelli |
| 6,665,119 B1 | 12/2003 | Kurtz et al. |
| 6,714,350 B2 | 3/2004 | Silverstein et al. |
| 6,785,050 B2 | 8/2004 | Lines et al. |
| 6,809,864 B2 | 10/2004 | Martynov et al. |
| 6,811,274 B2 | 11/2004 | Olczak |
| 6,813,077 B2 | 11/2004 | Borrelli et al. |
| 6,816,290 B2 | 11/2004 | Mukawa |
| 6,844,971 B2 | 1/2005 | Silverstein et al. |
| 6,927,915 B2 | 8/2005 | Nakai |
| 6,943,941 B2 | 9/2005 | Flagello et al. |
| 6,972,906 B2 | 12/2005 | Hasman et al. |
| 7,009,768 B2 | 3/2006 | Sakamoto |
| 7,026,046 B2 | 4/2006 | Edlinger et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,075,722 B2 | 7/2006 | Nakai |
| 7,085,050 B2 | 8/2006 | Florence |
| 7,113,335 B2 | 9/2006 | Sales |
| 7,116,478 B2 | 10/2006 | Momoki et al. |
| 7,129,183 B2 | 10/2006 | Mori et al. |
| 7,142,363 B2 | 11/2006 | Sato et al. |
| 7,155,073 B2 | 12/2006 | Momoki et al. |
| 7,158,302 B2 | 1/2007 | Chiu et al. |
| 7,203,001 B2 | 4/2007 | Deng et al. |
| 7,220,371 B2 | 5/2007 | Suganuma |
| 7,221,501 B2 | 5/2007 | Flagello et al. |
| 7,227,684 B2 | 6/2007 | Wang et al. |
| 7,236,655 B2 | 6/2007 | Momoki et al. |
| 7,256,938 B2 | 8/2007 | Barton et al. |
| 7,268,946 B2 | 9/2007 | Wang |
| 7,297,386 B2 | 11/2007 | Suzuki et al. |
| 7,375,887 B2 | 5/2008 | Hansen |
| 7,414,784 B2 | 8/2008 | Mi et al. |
| 7,466,484 B2 | 12/2008 | Mi et al. |
| 7,511,884 B2 | 3/2009 | Flagello |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,692,860 B2 | 4/2010 | Sato et al. |
| 7,722,194 B2 | 5/2010 | Amako et al. |
| 7,755,718 B2 | 7/2010 | Amako et al. |
| 7,800,823 B2 | 9/2010 | Perkins |
| 7,944,544 B2 | 5/2011 | Amako et al. |
| 7,961,393 B2 | 6/2011 | Perkins |
| 8,009,355 B2 | 8/2011 | Nakai |
| 8,138,534 B2 | 3/2012 | Adkisson et al. |
| 2001/0053023 A1 | 12/2001 | Kameno et al. |
| 2002/0015135 A1 | 2/2002 | Hanson |
| 2002/0040892 A1 | 4/2002 | Koyama et al. |
| 2002/0167727 A1 | 11/2002 | Hansen et al. |
| 2002/0191286 A1 | 12/2002 | Gale et al. |
| 2003/0161029 A1 | 8/2003 | Kurtz et al. |
| 2003/0224116 A1 | 12/2003 | Chen et al. |
| 2003/0227678 A1 | 12/2003 | Lines et al. |
| 2004/0008416 A1 | 1/2004 | Okuno |
| 2004/0047039 A1 | 3/2004 | Wang et al. |
| 2004/0047388 A1 | 3/2004 | Wang et al. |
| 2004/0174596 A1 | 9/2004 | Umeki |
| 2004/0201890 A1 | 10/2004 | Crosby |
| 2004/0258355 A1 | 12/2004 | Wang et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0122587 A1 | 6/2005 | Ouderkirk et al. |
| 2005/0175100 A1 | 8/2005 | Yamane et al. |
| 2005/0190445 A1 | 9/2005 | Fukuzaki |
| 2005/0195485 A1 | 9/2005 | Hirai et al. |
| 2005/0259324 A1 | 11/2005 | Flagello et al. |
| 2005/0275944 A1 | 12/2005 | Wang et al. |
| 2005/0277063 A1 | 12/2005 | Wang et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0113279 A1 | 6/2006 | Little |
| 2006/0127830 A1 | 6/2006 | Deng et al. |
| 2006/0215263 A1 | 9/2006 | Mi et al. |
| 2007/0183035 A1 | 8/2007 | Asakawa et al. |
| 2007/0217008 A1 | 9/2007 | Wang et al. |
| 2007/0242187 A1 | 10/2007 | Yamaki et al. |
| 2007/0242352 A1 | 10/2007 | MacMaster |
| 2007/0297052 A1 | 12/2007 | Wang et al. |
| 2008/0037101 A1 | 2/2008 | Jagannathan et al. |
| 2008/0038467 A1 | 2/2008 | Jagannathan et al. |
| 2008/0055549 A1 | 3/2008 | Perkins |
| 2008/0055719 A1 | 3/2008 | Perkins |
| 2008/0055720 A1 | 3/2008 | Perkins |
| 2008/0055721 A1 | 3/2008 | Perkins |
| 2008/0055722 A1 | 3/2008 | Perkins |
| 2008/0055723 A1 | 3/2008 | Gardner et al. |
| 2008/0094547 A1 | 4/2008 | Sugita et al. |
| 2008/0137188 A1 | 6/2008 | Sato et al. |
| 2008/0192346 A1 | 8/2008 | Kim et al. |
| 2008/0316599 A1 | 12/2008 | Wang et al. |
| 2009/0009865 A1* | 1/2009 | Nishida et al. ............... 359/486 |
| 2009/0040607 A1 | 2/2009 | Amako et al. |
| 2009/0041971 A1 | 2/2009 | Wang et al. |
| 2009/0053655 A1 | 2/2009 | Deng et al. |
| 2009/0109377 A1 | 4/2009 | Sawaki et al. |

(56) References Cited

U.S. PATENT DOCUMENTS

| | | | |
|---|---|---|---|
| 2010/0103517 | A1 | 4/2010 | Davis et al. |
| 2010/0328768 | A1 | 12/2010 | Lines |
| 2011/0080640 | A1 | 4/2011 | Kaida et al. |
| 2011/0096396 | A1 | 4/2011 | Kaida et al. |
| 2011/0235181 | A1 | 9/2011 | Hayashibe et al. |
| 2012/0008205 | A1 | 1/2012 | Perkins et al. |
| 2012/0075699 | A1 | 3/2012 | Davis |
| 2012/0250154 | A1 | 10/2012 | Davis |
| 2013/0077164 | A1 | 3/2013 | Davis |
| 2013/0155516 | A1 | 6/2013 | Lines et al. |
| 2013/0201557 | A1 | 8/2013 | Davis et al. |
| 2013/0250411 | A1 | 9/2013 | Bangerter |
| 2013/0258471 | A1 | 10/2013 | Davis |

FOREIGN PATENT DOCUMENTS

| | | |
|---|---|---|
| DE | 3707984 A1 | 9/1988 |
| DE | 10327963 | 1/2005 |
| DE | 10341596 | 4/2005 |
| DE | 102004041222 | 3/2006 |
| EP | 300563 | 1/1989 |
| EP | 2270553 | 1/2011 |
| JP | 58-042003 | 3/1983 |
| JP | 03084502 | 4/1991 |
| JP | 6138413 | 5/1994 |
| JP | 06-174907 | 6/1994 |
| JP | 7005316 | 1/1995 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10073722 A | 3/1998 |
| JP | 10-153706 | 6/1998 |
| JP | 11-014814 | 1/1999 |
| JP | 11142650 | 5/1999 |
| JP | 11-174396 | 7/1999 |
| JP | 11237507 | 8/1999 |
| JP | H11237507 A | 8/1999 |
| JP | 11-306581 | 11/1999 |
| JP | 2000284117 | 10/2000 |
| JP | 2001074935 | 3/2001 |
| JP | 2004157159 | 6/2004 |
| JP | 2004309903 | 11/2004 |
| JP | 2005195824 | 7/2005 |
| JP | 2006047813 | 2/2006 |
| JP | 2006-133402 | 5/2006 |
| JP | 2006201540 | 8/2006 |
| JP | 2006-330178 | 12/2006 |
| JP | 2007-58100 | 3/2007 |
| JP | 2007-101859 | 4/2007 |
| KR | 10-2005-0017871 | 2/2005 |
| KR | 10-0707083 | 4/2007 |
| SU | 1283685 | 1/1987 |
| SU | 1781659 A1 | 12/1992 |
| WO | WO03/069381 | 8/2003 |
| WO | WO2004013684 | 2/2004 |
| WO | WO2005/101112 | 10/2005 |
| WO | WO2005/123277 | 12/2005 |
| WO | WO2006/036546 | 4/2006 |
| WO | WO 2011/056496 | 5/2011 |

OTHER PUBLICATIONS

Auton, "Infrared Transmission Polarizers by Photolithography." Applied Optics Jun. 1967 vol. 6, No. 6, pp. 1023-1027.

Baur, "A new type of beam splitting polarizer cube." Meadowlark Optics, 2005, pp. 1-9.

Bird et al., "The Wire Grid as a Near-Infrared Polarizer." J. Op. Soc. Am. vol. 50 No. 9 (1960).

Brummelaar et al., "Beam combining optical components," Chara Technical Report, Jan. 5, 1998, pp. TR61-1 to TR 61-17, No. 61.

Bruzzone, et al., "High-performance LCoS optical engine using cartesian polarizer technlogy," SID 03 Digest, 2003, pp. 1-4.

Chen, et al. "Novel polymer patterns formed by lithographically induced self-assembly (LISA).", American Chemical Society, Jan. 2005, pp. 818-821, vol. 21, No. 3.

Chen, J. et al. "Optimum film compensation modes for TN and VA LCDs." SID 98 Digest, pp. 315-318, 1998.

Compact Disc Audio, http://hyperphusics.phy-astr.gsu.edu/hbase/audio/cdplay.html.

Dainty, et al, "Measurements of light scattering by characterized random rough surface." Waves in Random Media 3 (1991).

Deguzman et al., "Stacked subwavelength gratings as circular polarization filters." Applied Optics, Nov. 1, 2001, pp. 5731-5737, vol. 40, No. 31.

Deng et al. "Multiscale structures for polarization control by using imprint and UV lithography." Proc. of SPIE, 2005, pp. 1-12. vol. 6003.

Deng et al. "Wideband antireflective polarizers based on integrated diffractive multilayer microstructures." Optics Letters, Feb. 1, 2006, pp. 344-346, vol. 31., No. 3.

DeSanto et al, "Rough surface scattering." Waves in Random Media 1 (1991).

Enger et al, "Optical elements with ultrahigh spatial-frequency surface corrugations." Applied Optics Oct. 15, 1983, vol. 22, No. 20 pp. 3220-3228.

Flanders, "Application of .100 Δ linewidth structures fabricated by shadowing techniques." J. Vac. Sci. Technol., 19(4), Nov./Dec. 1981.

Flanders, "Submicron periodicity gratings as artificial anisotropic dielectrics." Appl. Phys. Lett. 42 (6), Mar. 15, 1983, pp. 492-494.

Fritsch, et al., "A liquid-crystal phase modulator for large-screen projection." IEEE, Sep. 1989, pp. 1882-1887, vol. 36, No. 9.

Glytsis et al, "High-spatial-frequency binary and multilevel stairstep gratings: polarization-selective mirrors and broadband antireflection surfaces." Applied Optics Aug. 1, 1992 vol. 31, No. 22 pp. 4459-4470.

Haggans et al., "Lamellar gratings as polarization components for specularly reflected beams." Journal of Modern Optics, 1993, vol. 40, No. 4, pp. 675-686.

Haisma et al. "Mold-assisted nanolithography: a process for reliable pattern replication." Journal Vac. Sci. Technology B, Nov./Dec. 1996, pp. 4124-4128, vol. 14, No. 6.

Handbook of Optics vol. II, $2^{nd}$ Edition, pp. 3.32-3.35.

Handbook of Optics, 1978, pp. 10-68-10-77.

Hass et al, "Sheet Infrared Transmission Polarizers." Applied Optics Aug. 1965, vol. 4, No. 8 pp. 1027-1031.

Ho, G H et al. "the mechanical-optical properties of wire-grid type polarizer in projection display system." SID 02 Digest, pp. 648-651, 2002.

Knop, "Reflection Grating Polarizer for the Infrared." Optics Communications vol. 26, No. 3, Sep. 1978.

Kostal et al. "Adding parts for a greater whole." SPIE' s oeMagazine, May 2003, pp. 24-26.

Kostal et al. "MEMS Meets Nano-optics the marriage of MEMES and nano-optics promises a new and viable platform for tunable optical filters." www.fiberoptictechnology.net, Fiber Optic Technology, Nov. 2005, pp. 8-13.

Kostal, Hubert "Nano-optic devices enable integrated fabrication." www.laserfocuswold.com, Jun. 2004 pp. 155, 157-159.

Kostal, Hubert "Nano-optics: robust, optical devices for demanding applications." Military & Aerospace Electronics, Jul. 2005, 6 pages.

Kostal, Hubert, NanoTechnology "using advanced lithography to pattern nano-optic devices." www.solid-state.com, Sep. 2005, p. 26 and 29.

Kuta et al. "Coupled-wave analysis of lamellar metal transmission gratings for the visible and the infrared." J. Opt. Soc. Am. A/vol. 12, No. 5 /May 1995.

Lavin, "Specular Reflection." Monographs on App. Opt. No. 2.

Li Li et al , "Visible broadband, wide-angle, thin-film multilayer polarizing beam splitter." Applied Optics May 1, 1996, vol. 35, No. 13, pp. 2221-2224.

Lloyd William Taylor, Manual of Advanced Undergraduate Experiments in Physics, p. 302 (1959).

(56) References Cited

OTHER PUBLICATIONS

Lockbihler et al. "Diffraction from highly conducting wire gratings of arbitrary cross-section." Journal of Modern Optics, 1993, vol. 40, No. 7, pp. 1273-1298.
Lopez, et al. "Wave-plate polarizing beam splitter based on a form-birefringent multilayer grating." Optics Letters, vol. 23, No. 20, pp. 1627-1629, Oct. 15, 1998.
Maystre & Dainty, Modern Analysis of Scattering Phenomena Proceeding from International Workshop held at Domaine deTournon, Aix en Provence, France Sep. 5-8, 1990.
Moshier et al. "The Corrosion and Passively of Aluminum Exposed to Dilute Sodium Sulfate Solutions." Corrosion Science vol. 27. No. 8 pp. 785-801 1987.
N.M. Ceglio, Invited Review "Revolution in X-Ray Optics." J. X-Ray Science & Tech. 1, 7-78 (1989).
Nordin et al., "Micropolarizer array for infrared imaging polarimetry." J. Op. Soc. Am. A. vol. 16 No. 5, May 1999.
Novak et al., "Far infrared polarizing grids for use at cryogenic temperatures." Applied Optics, Aug. 15, 1989/vol. 28, No. 15, pp. 3425-3427.
Optics $9^{th}$ Edition, pp. 338-339 (1980).
Park, et al. "Nano-optics redefine rules for optical processing." NanoOptic Corp, 3 pages.
Pentico, Eric et al., "New, High Performance, Durable Polarizers for Projection Displays." SID 01 Digest, 2001, pp. 1287-1289.
ProFlux, www.moxtek.comm pp. 1-4.
Richter, Ivan et al. "Design considerations of form birefringent microstructures." Applied Optics, vol. 34, No. 14, pp. 2421-2429, May 10, 1995.
Robinson et al., "Wide Field of View Compensation Scheme for Cube Polarizing Beam Splitters." SID 03 Digest, pp. 1-4, www.colorlink.com.
Savas et al. "Achromatic interferometric lithography for 100-nm-period gratings and grids." Journal Vac. Sci. Technology B, Nov./Dec. 1995, pp. 2732-2735, vol. 13, No. 6.
Scandurra, et al. "Corrosion Inhibition of Al Metal in Microelectronic Devices Assemble in Plastic Packages." Journal of the Electrochemical Society, 148 (8) B289-B292 (2001).
Sonek et al., "Ultraviolet grating polarizers." J. Vac. Sci. Technol., 19(4), Nov./Dec. 1981, pp. 921-923.
Stenkamp et al, "Grid polarizer for the visible spectral region." SPIE vol. 2213 pp. 288-296.
Takano, Kuniyoshi et al. "Cube polarizers by the use of metal particles in anodic alumina films." Applied Optics, vol. 33, No. 16, 3507-3512, Jun. 1, 1994.
Tamada et al., "Aluminum-wire grid polarizer for a compact magneto-optic pickup device." 2 pages.

Tyan et al., "Polarizing beam splitter based on the anisotropic spectral reflectivity characteristic of form-birefringent multilayer gratings." Optics Letters, May 15, 1996, pp. 761-763, vol. 21, No. 10.
Tyan, Rong-Chung et al. "Design, fabrication, and characterization of form-birefringent multilayer polarizing beam splitter." Optical Society of America, vol. 14, No. 7, pp. 1627-1636, Jul. 1997.
VLSI Technology, $2^{nd}$ Edition, pp. 198-199 dated 1988.
Wang et al. "Diffractive optics: nanoimprint lithography enables fabrication of subwavelength optics." LaserFocusWorld, http://lfw.pennnet.com/Articles/Article_Dispaly.cf . . . Apr. 19, 2006, 6 pages.
Wang et al. "Fabrication of a new broadband waveguide polarizer with a double-layer 190 nm period metal-gratings using nanoimprint lithography." Journal Vac. Sci. Technology B, Nov./Dec. 1999, pp. 2957-2960, vol. 17, No. 6.
Wang et al. "High-performance large-area ultra-broadband (UV to IR) nanowire-grid polarizers and polarizing beam-splitters." Proc. of SPIE 2005, pp. 1-12, vol. 5931.
Wang et al. "High-performance nanowire-grid polarizers" Optical Society of America. 2005, pp. 195-197, vol. 30, No. 2.
Wang et al. "Monolithically integrated isolators based on nanowire-grid polarizers." IEEE, Photonics Technology Letters, Feb. 2005, pp. 396-398, vol. 17, No. 2.
Wang, et al., "Innovatic High-Performance Nanowrie-Grid Polarizers and integrated Isolators," IEEE Journal of Selected Topics in Quantum Electronics, pp. 241-253, vol. 11 No. 1 Jan./Feb. 2005.
Wang, Jian et al. "Free-Space nano-optical devices and integration: design, fabrication, and manufacturing." Bell Labs Technical Journal, 2005 pp. 107-127, vol. 10, No. 3.
Whitbourn et al, "Phase shifts in transmission line models of thin periodic metal grids." Applied Optics Aug. 15, 1989 vol. 28, No. 15, pp. 3511-3515.
Zamzicchi et al., "Corrosion Inhibitors for Aluminum Films." David Sarnoff Research Center, Princeton, NJ 08543-5300.
Zhang et al., "A broad-angle polarization beam splitter based on a simple dielectric periodic structure." Optices Express, Oct. 29, 2007, 6 pages, vol. 15, No. 22.
U.S. Appl. No. 13/495,296, filed Jun. 13, 2012; Michael Lines; office action dated Sep. 25, 2013.
U.S. Appl. No. 13/075,470, filed Mar. 30, 2011; Mark Alan Davis; office action dated Oct. 7, 2013.
U.S. Appl. No. 13/224,719, filed Sep. 2, 2011; Mark Alan Davis; notice of allowance dated Oct. 1, 2013.
U.S. Appl. No. 13/326,566, filed Dec. 15, 2011; Mark Alan Davis; office action dated Dec. 16, 2013.

* cited by examiner

FINE PITCH WIRE GRID POLARIZER

CLAIM OF PRIORITY

This is a continuation of U.S. patent application Ser. No. 13/224,719, filed Sep. 2, 2011; which claims priority to U.S. Provisional Patent Application Ser. Nos. 61/384,796, filed on Sep. 21, 2010, and 61/384,802, filed on Sep. 21, 2010; which are hereby incorporated herein by reference in their entirety.

BACKGROUND

Nanometer-sized devices, such as wire grid polarizers, can be limited in performance by the distance between adjacent features, or the pitch of one feature to the next. For example, for effective polarization of electromagnetic radiation, the pitch in a wire grid polarizer should be less than half the wavelength of the electromagnetic radiation. Wire grid polarizers, with pitch smaller than half the wavelength of visible light, have been demonstrated. See for example U.S. Pat. Nos. 6,208,463; 6,122,103; and 6,243,199. For higher polarization contrast and to allow polarization of smaller wavelengths, such as for polarization of ultra-violet light and x-rays, smaller pitches are needed. Various methods have been proposed to solve this problem. See for example U.S. Pat. No. 7,692,860 and U.S. Publication numbers 2009/0041971 and 2009/0053655.

A desirable feature of wire grid polarizers is to polarize a broad spectrum of electromagnetic radiation with a single polarizer. Wire grid polarizers are typically formed with wires that are the same height. It would be beneficial to form wire grid polarizers with variable wire height in order to allow tuning of the wire grid polarizer for multiple wavelengths and to allow for a smoother Ts curve. Methods have been proposed for wire grid polarizers with different height wires. See for example U.S. Publication numbers 20080037101 and 20080038467.

Wire grid polarizers are typically formed with wires that are situated along a single plane. It would be beneficial to form wire grid polarizers with wires situated at multiple planes. A wire grid polarizer with wires that are situated along multiple planes may be tuned to multiple wavelengths and may allow for a smoother Ts curve. See for example U.S. Publication numbers 20080037101 and 20080038467.

Wire grid polarizers are typically formed with wires that are all comprised of single materials. A wire grid polarizer with some wires comprised one material and other wires comprised of a different material would be beneficial for tuning the wire grid polarizer to multiple wavelengths.

SUMMARY

It has also been recognized that it would be advantageous to develop a nanometer-sized device, such as a wire grid polarizer, with very small spacing between adjacent features, i.e. small pitch. It has been recognized that it would be advantageous to develop a nanometer-sized device, such as a wire grid polarizer in which there is variable wire height, with wires situated at multiple planes, and/or with a wire array in which wires may be comprised of a different material than an adjacent wire.

The inventions described herein may have multiple uses, but a primary use is as a wire grid polarizer. The terms "wire grid polarizer" or "polarizer" will primarily be used for simplicity, but the invention may be used for other purposes.

The present invention is directed to a polarizer with a repeated pattern of groups of parallel elongated wires disposed over a substrate. Each group of elongated wires can comprise at least three wires. In one embodiment, at least one wire at an interior of each group can be taller by more than 10 nanometers than outermost wires of each group and distance between the outermost wires in each group can be less than 1 micrometer. This embodiment has an advantage of variable height wires, such that one wire is taller than another. In another embodiment, the wires can be a byproduct of an etch reaction.

In another embodiment, the present invention is also directed to a method for making a polarizer. The method comprises a resist over a base, then patterning the resist and creating resist widths. An isotropic etch of the base can then be performed, etching both vertically into the base laterally outside the resist and horizontally under the resist leaving a stem under the resist. Etch redeposition is allowed on the vertical sidewall of the stem, thus creating etch redeposition wires. The base outside the resist can also be etched vertically, leaving a bottom step in the base. Etch redeposition is allowed to form on the vertical sidewall of the bottom step of the base, thus creating additional etch redeposition wires. This embodiment has an advantage of wires made by etch reaction. The wires can also have very fine pitch.

DEFINITIONS

Figure 1:
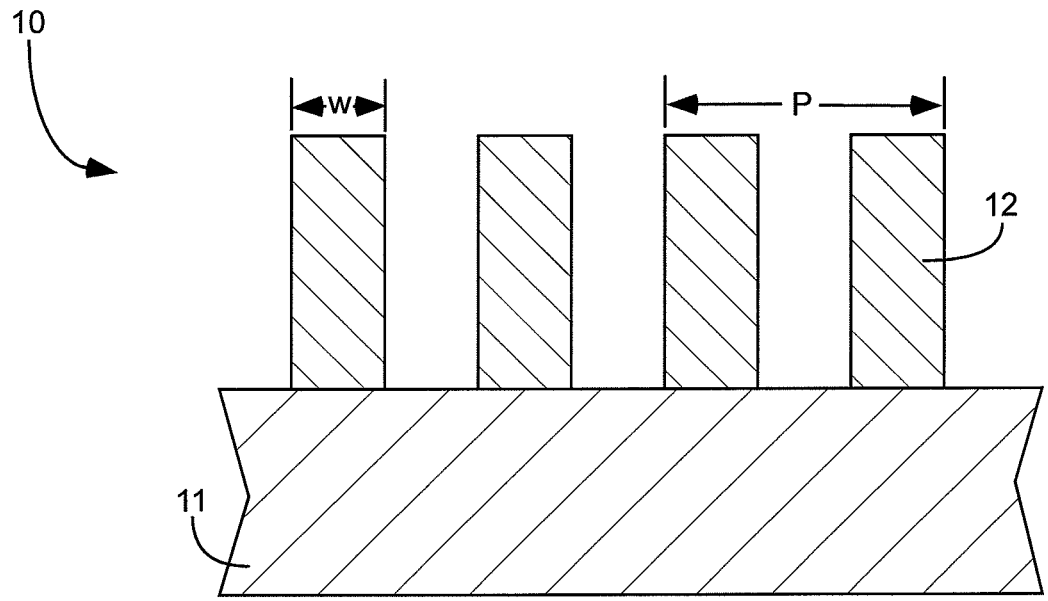
FIG. 1 is a schematic cross-sectional side view of a wire grid polarizer in accordance with an embodiment of the present invention.

As used in this description and in the appended claims, the word "electromagnetic radiation" includes infrared, visible, ultraviolet, and x-ray regions of the electromagnetic spectrum.

As used herein, the terms wire, rod, rail, and rib are used to describe various elongated structures having lengths significantly longer than width or height. Wires, rods, rails, and ribs can have various cross-sectional shapes. Wires, rods, and rails can refer to polarizing structures in a wire grid polarizer and ribs can refer to an elongated support structure for wires.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Fine Pitch Wire Grid Polarizer

As illustrated in FIG. 1, a polarizer 10 includes an array of parallel, elongated wires 12 disposed on a substrate 11. The substrate 11 can be transmissive of the wavelength of electromagnetic radiation used. The wires can have a pitch of less than 80 nanometers. In one embodiment, the wires can have a pitch of 60-80 nanometers. In another embodiment, the wires can have a pitch of 8-85 nanometers. In another embodiment, the wires can have a pitch of 20-85 nanometers. In one embodiment, the wires can have a width w of less than 55 nanometers. In another embodiment, the wires can have a width w of less than 35 nanometers. In another embodiment, the wires can have a width w of less than 15 nanometers. Polarizers, with pitch of 8-85 nanometers, may be used for polarization of electromagnetic radiation having wavelengths of around 16-170 nanometers. For polarization of such electromagnetic radiation, vanadium and hafnium can be good materials of choice for the wires 12.

The wires 12 can be formed of aluminum oxide; aluminum silicate; antimony trioxide; antimony sulphide; beryllium oxide; bismuth oxide; bismuth triflouride; boron nitride; boron oxide; cadmium sulfide; cadmium telluride; calcium fluoride; ceric oxide; chiolite; cryolite; cupric oxide; cupric chloride, cuprous chloride, cuprous sulfide; germanium; hafnium dioxide; lanthanum fluoride; lanthanum oxide; lead chloride; lead fluoride; lead telluride; lithium fluoride; magnesium fluoride; magnesium oxide; neodymium fluoride; neodymium oxide; niobium oxide; praseodymium oxide; scandium oxide; silicon; silicon oxide; disilicon trioxide; silicon carbide; silicon dioxide; sodium fluoride; silicon nitride; tantalum oxide; tantalum pentoxide; tellurium; titanium; titanium dioxide; titanium nitride, titanium carbide; thallous chloride; tungsten; yttrium oxide; zinc selenide; zinc sulfide; zirconium dioxide, and combinations thereof.

First Wire Grid Polarizer Manufacturing Method

Figure 2:
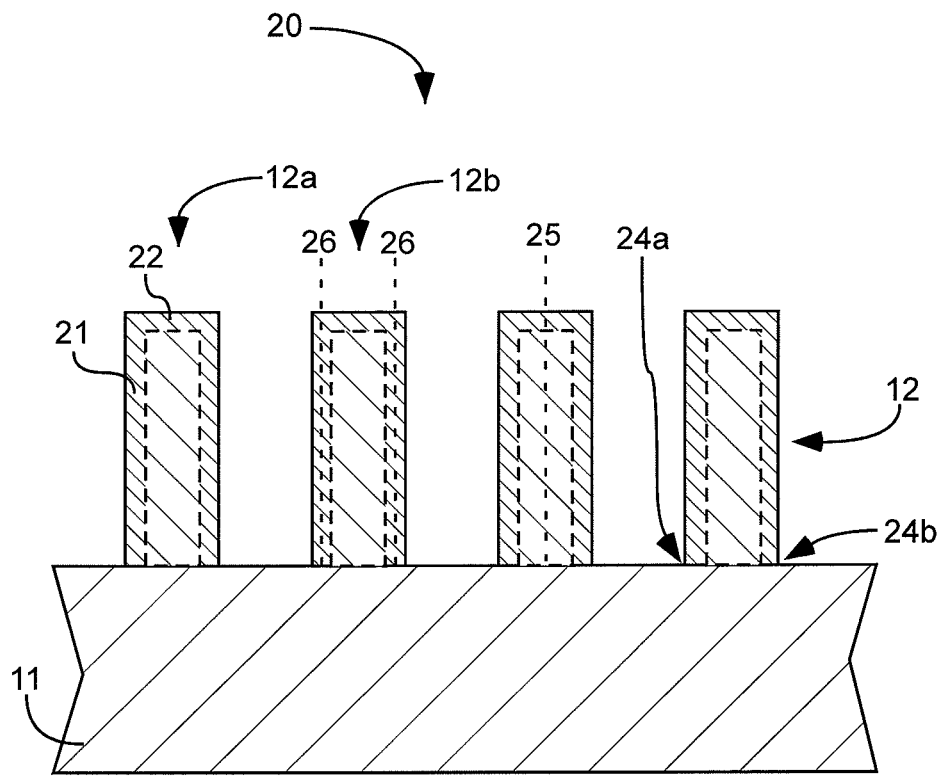
FIG. 2 is a schematic cross-sectional side view showing one step in making a wire grid polarizer, in accordance with an embodiment of the present invention.

FIGS. 1-4 show one method of manufacturing a fine pitch wire grid polarizer. A wire grid polarizer 10, shown in FIG. 1, having an array of parallel, elongated wires 12 disposed on a substrate 11, can have a protective layer 21-22 disposed at a surface of the wires 12, as shown in FIG. 2. The protective layer 21-22 can be disposed at a top surface 22 of the wires 12 and also at sides 21 of the wires 12. The protective layer 21-22 can be formed by passivation of the wires 12, and thus can be embedded in the wires 12. The purpose of the protective layer 21-22 is to make surfaces of the wires more etch resistant than central portions of the wires.

Figure 3:
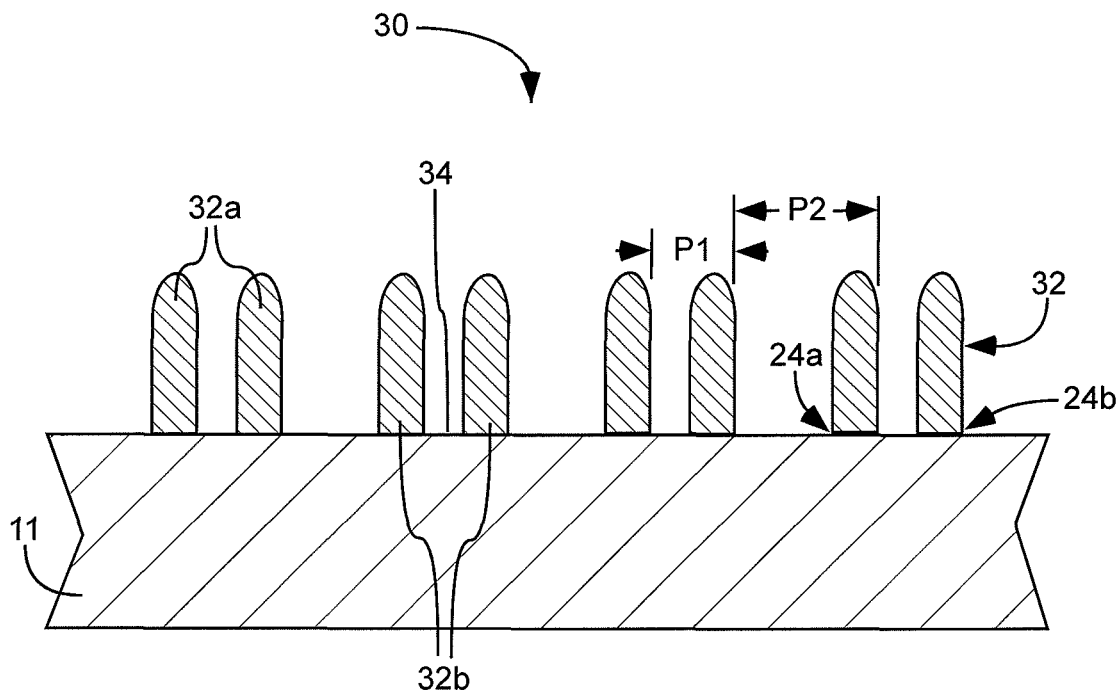
FIG. 3 is a schematic cross-sectional side view showing one step in making a wire grid polarizer, in accordance with an embodiment of the present invention.

The second step 30, shown in FIG. 3, is to anisotropically etch the wire grid polarizer to form two parallel, elongated rods 32 substantially located at corners 24a-b where the wires contacted the substrate 11. The anisotropic etch can preferentially remove wires at a central portion 25 of the wire 12, thus exposing the substrate 34 in the location of the former center 25 of the wire 12 while leaving wire material at corners 24a-b. The central portion 25 is preferentially removed because the protective layer 21-22 can be more resistant to the anisotropic etch than the wire 12 itself and thus after etching through the protective layer 22 on top of the wire, the anisotropic etch proceeds rapidly through the central portion 25 of the wire down to the substrate 34 while the side portions 26 of the wire etch more slowly due to the etch resistant protective layer 21. Thus, the original wire is essentially cut in half, forming two rods 32 in place of the original wire 12. Note, an alternative added step prior to the anisotropic etch is to ion mill the top of the wires 12, thus partially or totally removing the protective layer 22 prior to the anisotropic etch.

The two rods 32 can each be polarizing elements. Thus the wire grid polarizer can now have twice as many polarizing elements as before this step 30. For example, in FIG. 3, rod group 32a was formed of one original wire 12a and rod group 32b was formed of another original wire 12b. There can be a pitch P1 within a wire group and a pitch P2 between groups. These two pitches can be the same or can be different, depending on the original wire width w, original wire pitch P, wire material, type of protective layer 21-22, and nature of etch.

Wire grid polarizers, without the fine pitch method 30 described above, have been made by standard lithography and etching methods with pitches of around 100-150 nanometers and wire widths of around 50-75 nanometers. Thus, this method essentially cuts the pitch in half, allowing formation of wire grid polarizers by this method with pitches of around 50-75 nanometers and wire widths of around 25-38 nanometers, even with present lithography and etching methods.

Figure 4:
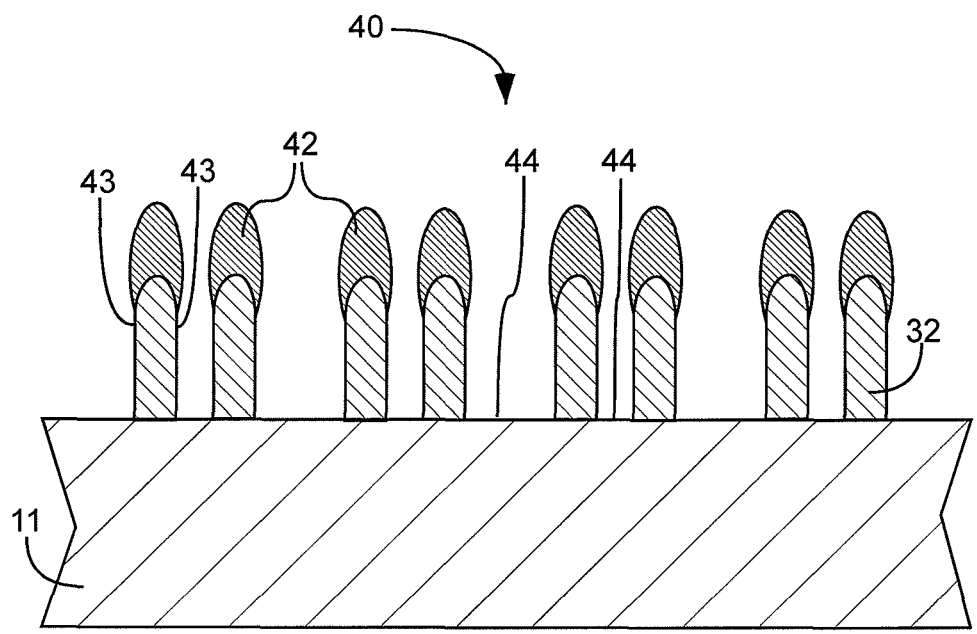
FIG. 4 is a schematic cross-sectional side view showing one step in making a wire grid polarizer, in accordance with an embodiment of the present invention.

An added step 40, shown in FIG. 4, that may be useful for some wire grid polarizer applications is to apply a segmented coating 42 on top of the rods 32. The segmented coating 42 can be aligned with the rods 32 and can continue partially down both sides 43 of the rods 32 without coating the substrate 44 exposed between the rods 32. This segmented coating may be applied by methods described in U.S. patent application Ser. Nos. 12/507,570, filed on Jul. 22, 2009 and 13/075,470, filed on Mar. 30, 2011, incorporated herein by reference.

Wire Grid Polarizer by Etch Redeposition

Figure 5:
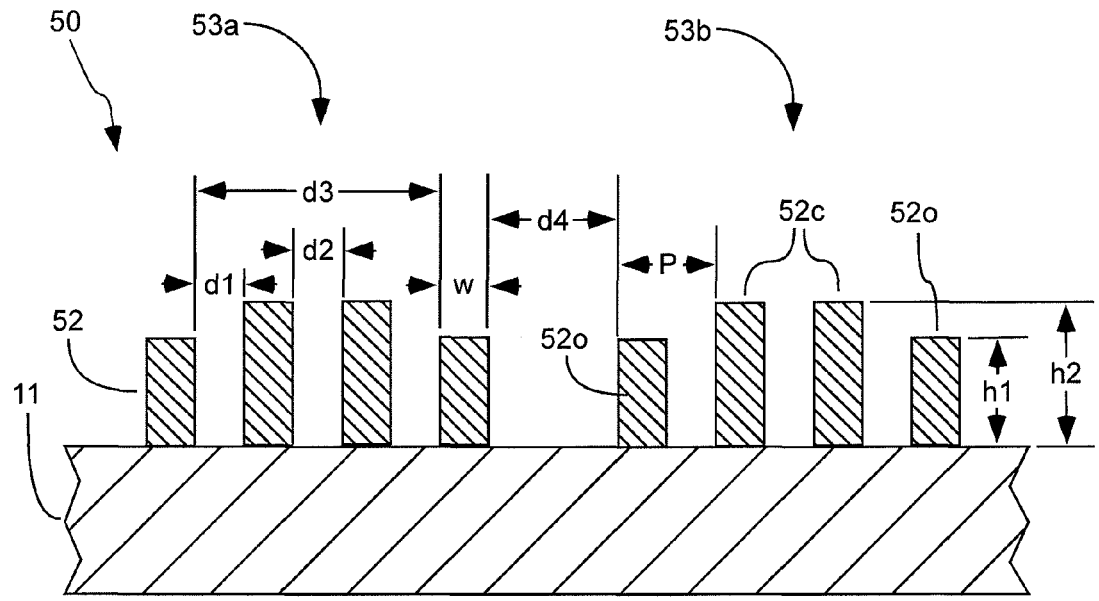
FIG. 5 is a schematic cross-sectional side view of a wire grid polarizer, in accordance with an embodiment of the present invention.

As illustrated in FIG. 5, a polarizer 50 includes a substrate 11 which can be transmissive of the wavelength of electromagnetic radiation used. For example, germanium could be used in the infrared, silicon in the visible, and quartz in the ultraviolet. A repeated pattern of groups 53 of parallel elongated wires 52 may be disposed on the substrate. The wires 52 may comprise a material that can polarize the incident electromagnetic radiation. Each group 53 of elongated wires 52 can comprise at least three wires. Each group can include one or more interior wires 52c, such as one or more center wires, and outermost wires 52o. The interior or center wires 52c can be taller than the outermost wires 52o, such as by more than 3 nm in one aspect, more than 10 nm in another aspect, more than about 20 nm in another aspect, or more than about 50 nm in another aspect. The distance between the outermost wires 52o, and thus the width d3 of each group 53, can be less than 1 micrometer in one aspect, less than about 150 nm in another aspect, less than about 100 nm in another aspect or less than about 50 nm in another aspect. The wires 52 can be a byproduct of an etch reaction, which material can be beneficial for some applications. The width d3 of each group 53 can be a resist width as will be described below, thus multiple wires can be formed for a single resist width, thus allowing manufacture of a wire grid polarizer having very fine pitch.

Shown in FIG. 5 are two groups of wires 53a and 53b, each group having four wires. Two wires 52c at the center of each group 53 can be approximately equal in height and both can be taller than the outermost wires 52o of each group, such that h1<h2. Center wires 52c of a group of wires 53 can be higher h2 than the height h1 of outer wires 52o in a group because center wires 52c can be formed first during initial isotropic etch(es). Having wires of different heights h can allow tuning the polarizer for different wavelengths and allow for smoothing out the s-polarization orientation of transmitted electromagnetic radiation over the spectrum of incident of electromagnetic radiation, or the Ts curve. Having some of the wires higher can increase polarizer contrast while having other wires shorter can improve transmission.

In one embodiment, center wires 52c and outer wires 52o can be made the same height h, such that h2=h1, by methods such as chemical mechanical polishing, fill and polish, spin on back etch, or other known planarization methods. Thus, a difference in height between the center wires 52c and the outer wires 52o can be between about 0 nm to about 150 nm, more than about 3 nm in one aspect, more than about 20 nm in another aspect, or more than about 50 nm in another aspect, depending on the strength, duration, and type of etch, the height of wires created, and whether the wires were planarized.

Shown in FIG. 5 is wire width w. Wire width may be determined by the type of etch during creation of that wire 52, thin film material and/or substrate material, and whether adjacent wires combine to form a single wire as described below in the description of FIG. 11. A maximum wire width of all wires 52 in the polarizer 10 can be less than about 150 nm in one aspect, less than about 50 nm in another aspect, less than about 20 nm in another aspect, or less than about 10 nm in another aspect. A wire width w of one wire may differ from a wire width w of an adjacent wire by more than 5 nm in one aspect, more than 10 nm in another aspect, more than 20 nm in another aspect, or more than 50 nm in another aspect.

Figure 6:
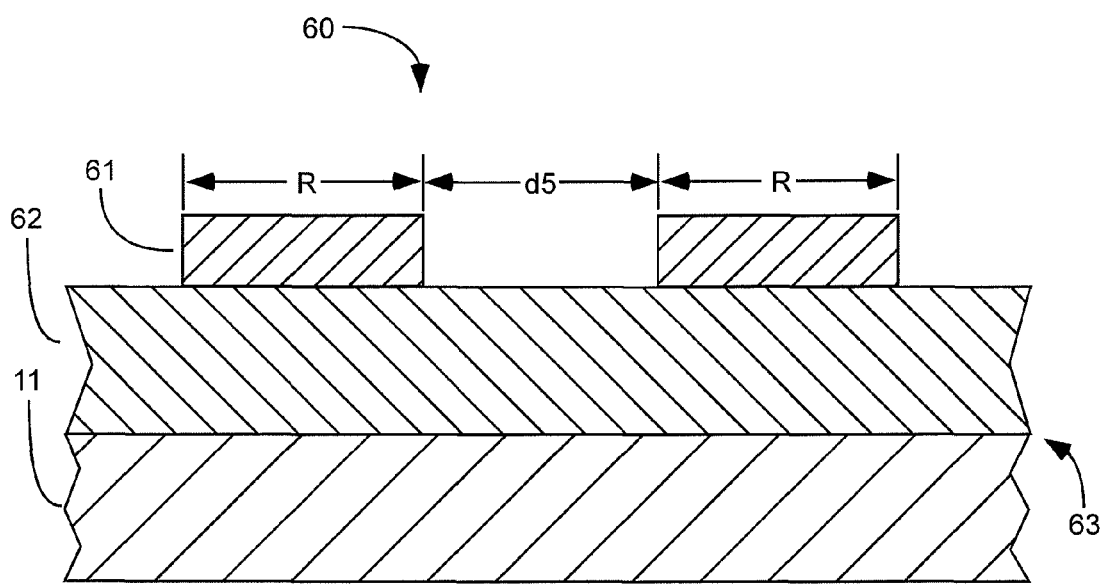
FIG. 6 is a schematic cross-sectional side view showing one step in the manufacture of a wire grid polarizer, in accordance with an embodiment of the present invention.

The distance between wires d in the groups of wires 53 can vary depending on the width of the resist and the nature and length of the etches. For example, a more lateral or stronger initial isotropic etch can result in a smaller distance d2, shown in FIG. 5, between the center wires 52c in a group 53. A distance d1 between a center wire 52c and an outer wire 52o depends on the resist width R, as shown in FIG. 6, the distance d2 between the center wires 52c, and the wire width w. Thus, by adjusting the parameters above, the distance d2 between the center wires 52c can be different from the distance d1 between an outermost wire and an adjacent center wire by more than about 3 nm in one aspect, more than about 10 nm in another aspect, or more than about 20 nm in another aspect. In other words, the absolute value of d2 minus d1 can be more than about 3 nm in one aspect, more than about 10 nm in another aspect, or more than about 20 nm in another aspect. A minimum distance d between adjacent wires can be less than about 150 nm in one aspect, less than about 50 nm in another aspect, or less than about 20 nm in another aspect.

As shown in FIG. 5, pitch P is a distance between an edge of one wire and a corresponding edge of an adjacent wire. A minimum pitch of adjacent wires can be less than about 300 nm in one aspect, less than about 100 nm in another aspect, less than about 50 nm in another aspect, less than about 30 nm in another aspect, or less than about 20 nm in another aspect. The pitch of the wires can thus be much smaller than, even approximately one fourth the pitch of, the pitch of the resist.

A distance d4 between adjacent groups 53 can be determined a distance d5 (see FIG. 6) between adjacent resist 61 and the width w of outermost wires 52o in a group. This distance d4 may be modified for tuning of the polarizer for desired wavelengths.

As shown in FIG. 6, a polarizer of the present invention can be made by disposing a resist 61 on a base 63. The base 63 can comprise a single material or can be layers of multiple materials. For example, in one embodiment the base 63 can comprise a thin film layer 62 disposed on a substrate 11. The thin film 62 may be applied on the substrate 11 by methods such as chemical vapor deposition or physical vapor deposition. The thin film may be a single layer of one material or may be multiple layers of different materials. The substrate 11 can be a rigid material such as quartz, silicon, or germanium. The substrate 11 can also be a flexible material such as a polymer.

The resist 61 may be patterned, providing resist widths R. The resist widths R can be less than about 1 micrometer in one aspect, less than about 100 nanometers in another aspect, less than about 75 nanometers in another aspect, or less than about 55 nanometers in another aspect. The resist width R can be the approximate distance d3 between outermost wires 52c in a group.

Figure 7:
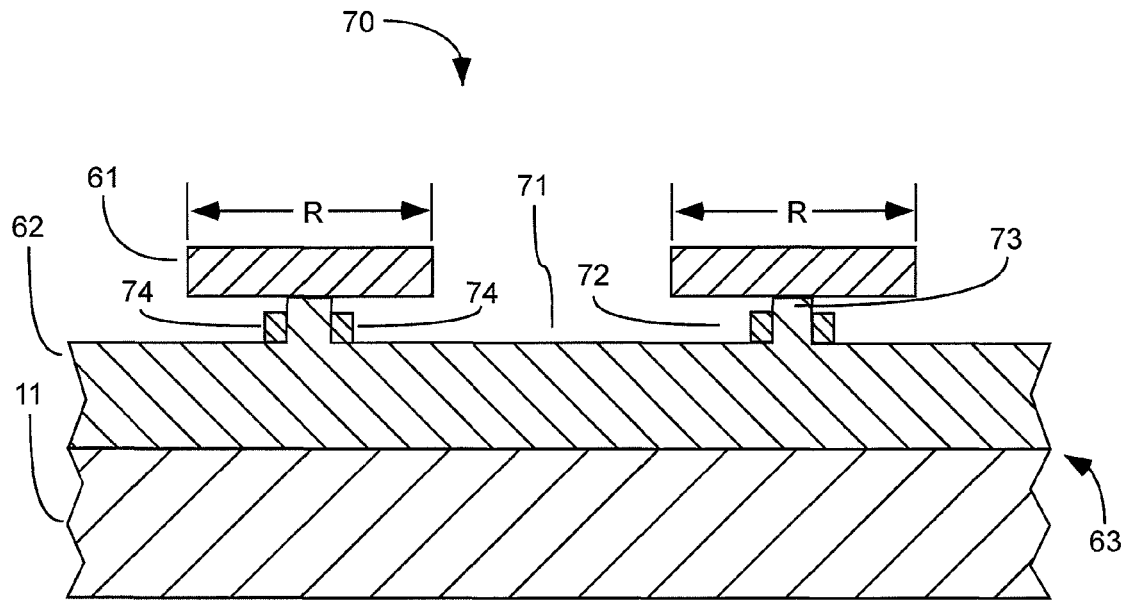
FIG. 7 is a schematic cross-sectional side view showing one step in the manufacture of a wire grid polarizer, in accordance with an embodiment of the present invention.

As shown in FIG. 7, an isotropic etch may then be performed, etching both vertically 71 into the base 63 laterally outside the resist and horizontally 72 under the resist leaving a stem 73, having vertical sidewalls, under the resist 61. The aforementioned isotropic etch, or a subsequent isotropic etch can be optimized for etch redeposition by etch chemistry, thus allowing etch redeposition along vertical sidewalls of the stem 73 creating etch redeposition wires 74. The etch redeposition wires 74 can be polarizing wires and thus polarizing wires may be formed as a byproduct of an etch reaction.

Figure 8:
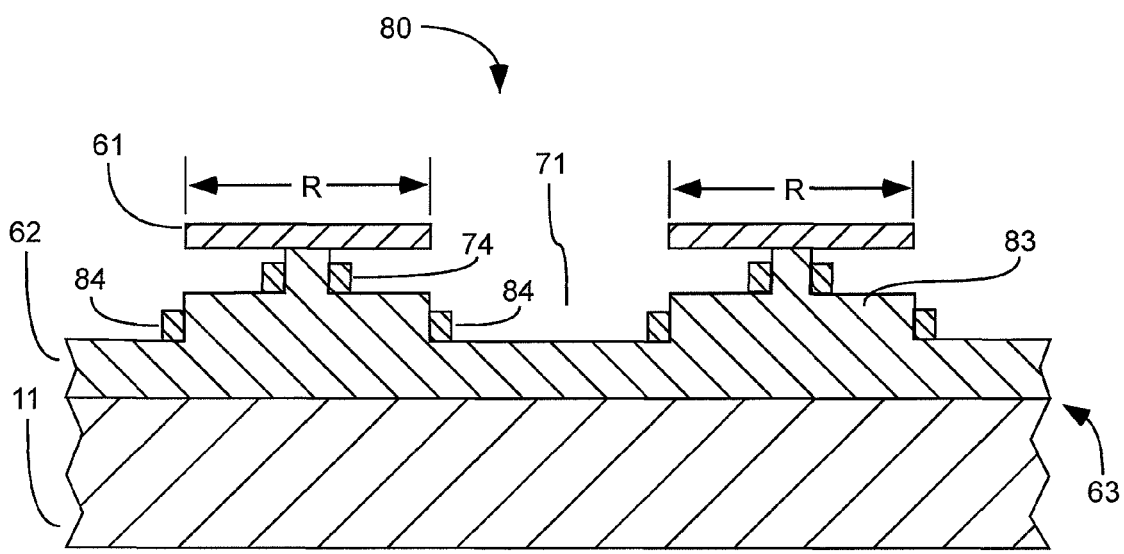
FIG. 8 is a schematic cross-sectional side view showing one step in the manufacture of a wire grid polarizer, in accordance with an embodiment of the present invention.

As shown in FIG. 8, an anisotropic etch can then be performed, etching vertically 71 into the base 63 outside the resist leaving a bottom step 83, having vertical sidewalls, in the base 63. The aforementioned anisotropic etch, or a subsequent anisotropic etch can be optimized for etch redeposition, thus allowing etch redeposition to occur along the vertical sidewalls of the bottom step and creating additional etch redeposition wires 84.

Depending on the material of the base and/or thin film and the type of etch, etch redeposition wires 74 & 84 can be comprised of a material such as metal oxide, metal alloy, metal halide, metal carbide, and organometal, or combinations thereof. Multiple isotropic etches before an anisotropic etch, with each subsequent isotropic etch being less isotropic in nature than the previous isotropic etch, can result in more than four wires for every resist width R.

Figure 9:
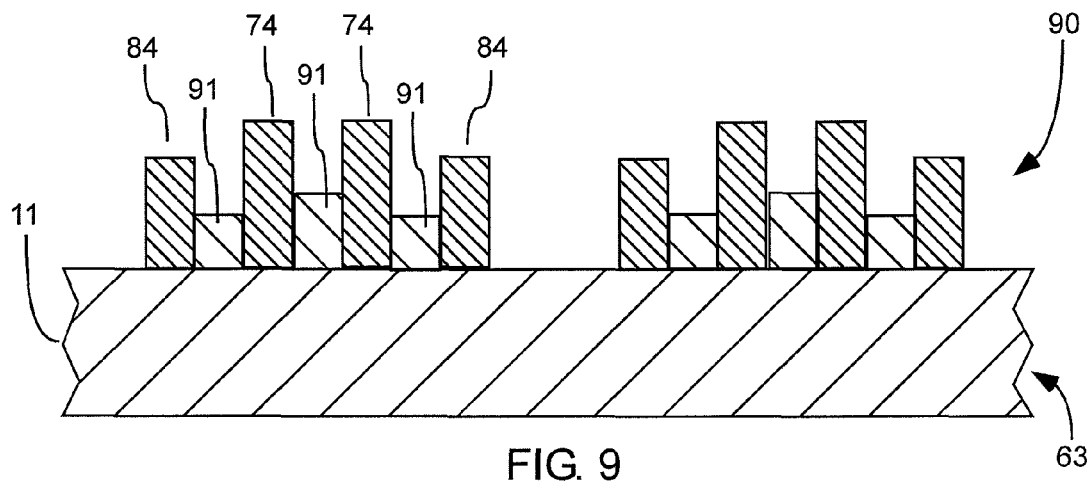
FIG. 9 is a schematic cross-sectional side view showing one step in the manufacture of a wire grid polarizer, in accordance with an embodiment of the present invention.
Figure 10:
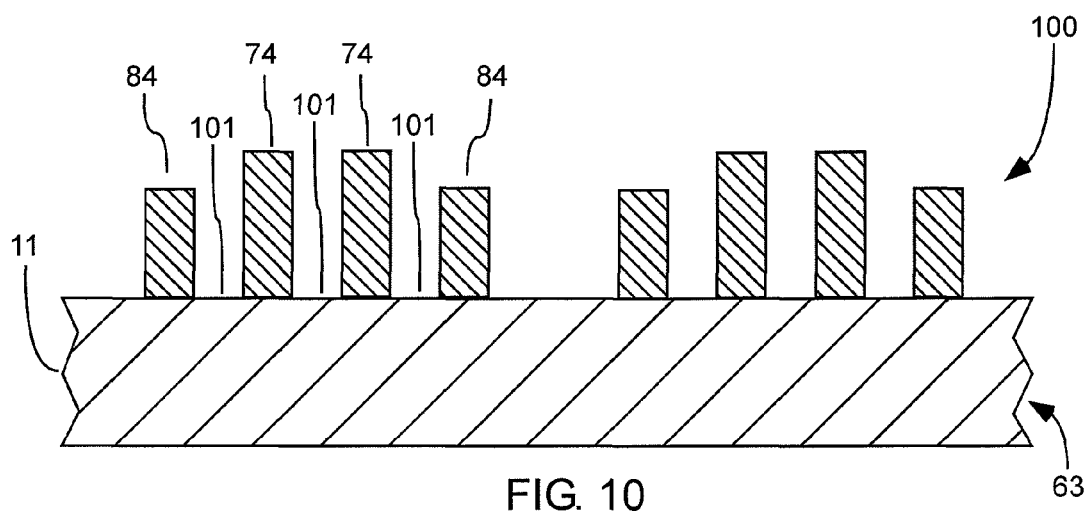
FIG. 10 is a schematic cross-sectional side view showing one step in the manufacture of a wire grid polarizer in accordance with an embodiment of the present invention.

As shown in FIGS. 9-10, the anisotropic etch may continue, remove the resist, etch the base 63 between 91 the wires and substantially or totally remove the base 63 between 101 etch redeposition wires 74 & 84, and leave at least four separate etch redeposition wires 74 and 84 for every original resist width R.

Figure 11:
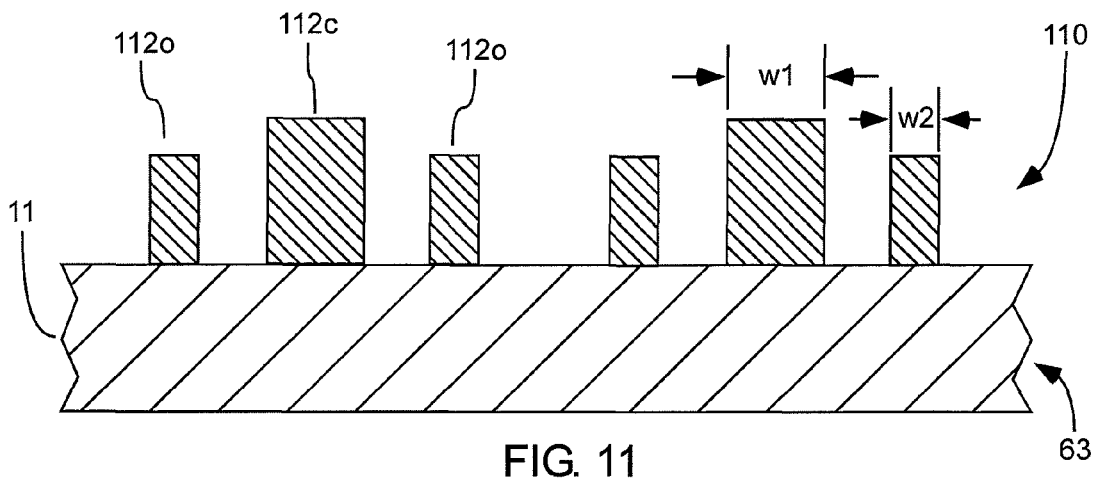
FIG. 11 is a schematic cross-sectional side view of a wire grid polarizer, in accordance with an embodiment of the present invention.

As shown in FIG. 11, a group of wires can have three wires comprising a center wire 112c and outer wires 112o. The method of making this structure is similar to that described above except that the stem 73 can be smaller than if two center wires are desired. Thus, as etch redeposition starts on both sides of the stem 73, the stem 73 can be substantially or completely etched away leaving a single center wire 112c rather than two center wires 52c as shown in FIG. 5. The single center wire 112c can be higher than outer wires 112o or can be approximately the same height as outer wires as was described above for the structure with at least four wires. If the center wires converge, and multiple isotropic etches are performed prior to the anisotropic etch, then there may be a structure with an odd number of at least five wires in each group.

A structure with a single wire at the center of each group may be beneficial if it is desired to have a large difference between widths of wires in a group. As shown in FIG. 11, a width w1 of the center wire 72c, can be substantially wider than a width w2 of an outer wire 72o of a group.

Multi-Step Wire Grid Polarizer

Figure 12:
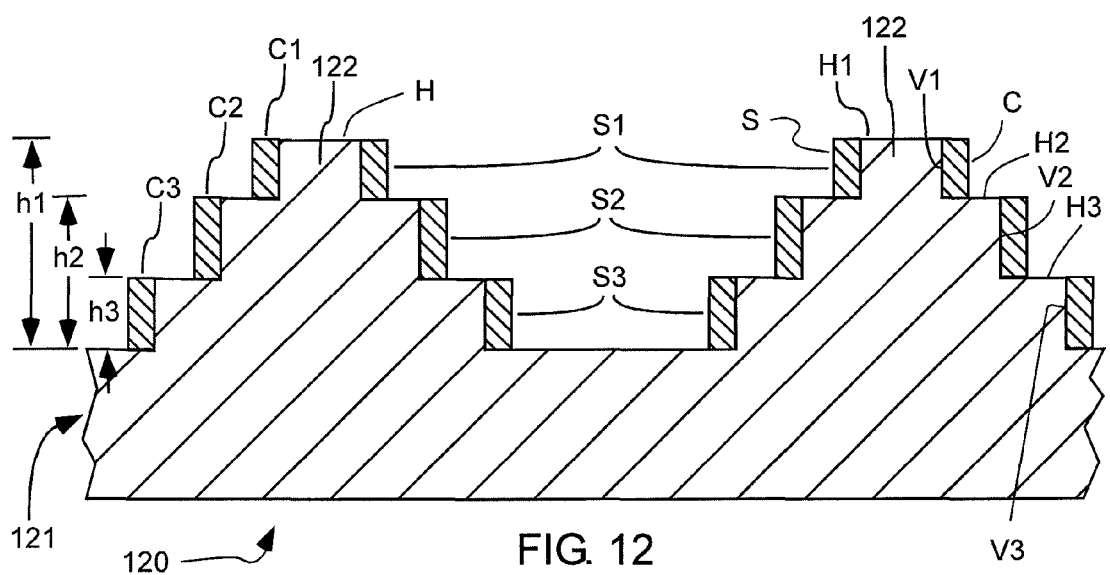
FIG. 12 is a schematic cross-sectional side view of a multi-step wire grid polarizer in accordance with an embodiment of the present invention.

As illustrated in FIG. 12, a multi-step, nanometer sized device or polarizer 120 includes a base 121 with a plurality of parallel multi-step ribs 122 disposed on the base 121. The term polarizer will hereafter be used, instead of nanometer sized device, because polarizer is the most typical application, but the device 120 can be used for other applications. Each rib 122 comprises multiple adjacent steps S of different heights h or disposed at different elevational heights. Each rib 122 includes an upper step S1 with a top horizontal surface H1 flanked by upper vertical surfaces V1. It will be appreciated that the terms horizontal and vertical are relative to the orientation of the device as shown in the figures, and that the device can be oriented at various different angles. Each rib also includes at least one lower step or pair of steps (with one step on either side of the upper step) having two horizontal surfaces, each flanked by a vertical surface for that step and by a vertical surface of an adjacent step. Thus, steps or pairs of steps are formed on both sides of the upper step, forming a cross-sectional stepped pyramid shape.

For example, the device in FIG. 12 shows two lower steps S2 and S3. Intermediate step S2 includes intermediate horizontal surfaces H2 and intermediate vertical surfaces V2. Intermediate horizontal surfaces H2 flank the upper vertical surfaces V1 and intermediate vertical surfaces V2. Lower step S3 includes lower horizontal surfaces H3 and lower vertical surfaces V3. Lower horizontal surfaces H3 flank the intermediate vertical surfaces V2 and lower vertical surfaces V3.

The ribs can have more or less than two lower steps. Each step S includes a coating C along the vertical surfaces V of the step S. The coating C along the vertical surface V of any step S can be separate from the coating C along a vertical surface V of an adjacent (upper or lower) step S, such as by the intervening horizontal surface H. Thus, a width or length HL of a horizontal surface H thereof can be greater than a thickness of the coating C. For example, in FIG. 12 there is no continuity of coating between the steps such that the coating C1 of the upper step S1 is physically separate from the coating C2 of the intermediate step S2 and the coating C2 of the intermediate step S2 is physically separate from the coating C3 of the lower step S3. The coatings C can form pairs of coatings or coating pairs at different elevational heights, such as an upper coating pair C1, and at least one lower coating pair, such as intermediate coating pair C2 and lower coating pair C3. If the device is used as a polarizer, and a coating C is selected that will polarize the wavelength of interest, then the coating C may be considered to be a polarizing coating rib. Thus, the coating may be a conductive coating and can define wires.

The upper and lower steps can be at different elevational heights h defining a cross-sectional stepped pyramid shape. For example, in FIG. 12, the elevational heights are not equal such that h1≠h2≠h3 and h1>h2>h3. The height of the steps can be determined by the depth of etching. Some embodiments of the present invention can have an elevational height of the upper step that is less than about 200 nm in one aspect or less than about 100 nm in another aspect. The rib, or steps or pairs of steps, can increase in width from the upper step so that the rib has a cross-sectional stepped pyramid shape.

The coating material C can be or can include a metal such as aluminum, copper, germanium, titanium oxide, tantalum, or a metal alloy. The coating material C can also be a dielectric such as silicon, silicon carbide, $Fe_2Si$, or hafnium. If the device is used as a wire grid polarizer, the coating material C can be a material that optimally polarizes the wavelengths of interest. For example, germanium could be used for infrared light, aluminum for visible light, or titanium oxide for ultraviolet light.

Figure 13:
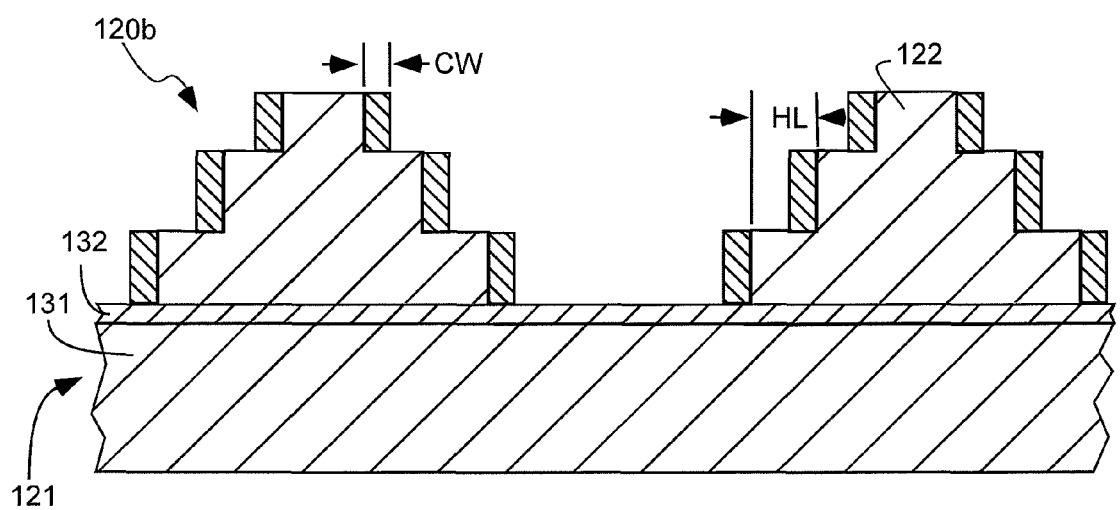
FIG. 13 is a schematic cross-sectional side view of a multi-step wire grid polarizer, in accordance with an embodiment of the present invention.

As shown in FIG. 13, the base 121 of polarizer 120b can comprise a substrate 131 and at least one thin film layer 132. The substrate 131 can comprise a material that is transparent to the incoming electromagnetic radiation. The substrate 131 can be a rigid material such as quartz, silicon, or germanium. The substrate 131 can also be a flexible material such as a casting film, polymer, or embossing substrate. The film layer 132 can be an anti-reflective coating, a transmissive film, an absorbing film, or other film with the desired optical properties.

The ribs 122 in the device can comprise the same material as the base 121 and can be are integrally formed in the base 121, such as by etching, as shown in FIG. 12. Alternatively, the ribs can be physically separate from the base, as shown in FIG. 13. In addition, the ribs 122 can comprise a different material from the base 121. The ribs 122 can comprise at least two layers of different materials. Each step can comprise multiple layers of different materials. A step S can be made of a different material than another step S. Each step S can be made of different materials. Multiple layers may be used for desired polarization characteristics, such as optimizing $T_p$, $T_s$, contrast, or absorption.

The coatings C can have very small widths CW. The width of the coating can be less than about 30 nm in one aspect, less than about 10 nm in another aspect, or less than about 5 nm in another aspect. The coating width can be selected or tuned based on the anticipated wavelength of the electromagnetic radiation and/or desired performance characteristics. Very narrow coating widths can be sustained by the structural support of the rib or steps thereof.

Figure 14:
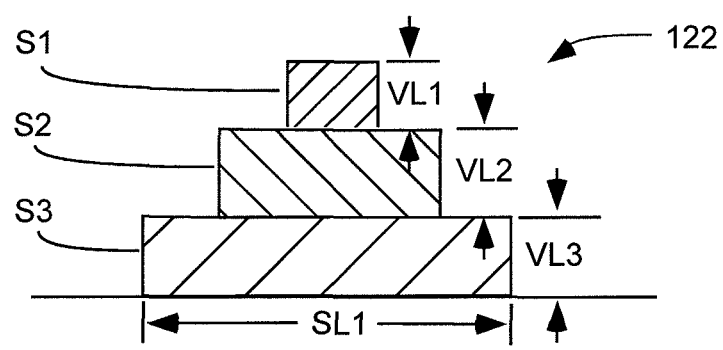
FIG. 14 is a schematic cross-sectional side view of a multi-step wire grid polarizer, in accordance with an embodiment of the present invention.

As shown in FIG. 14, a rib 122 of a polarizer can have vertical heights or length of vertical surfaces VL. In one embodiment, a vertical length VL of one step S can be the same as a vertical length VL of another step S, or all other steps S. In another embodiment, a vertical length VL of one step S can be different from a vertical length VL of another step S, or all other steps S. For example, the steps S can have substantially equal vertical lengths, VL1=VL2=VL3. Alternatively, the steps S can have unequal vertical lengths, VL1≠VL2≠VL3. A polarizer with different vertical lengths of vertical surfaces on different steps can have coating of different heights. Each coating height can be tuned for optimal polarization of a wavelength of interest. A difference of vertical length VL of one step compared to any other step can be more than 10 nanometers in one aspect, 10 to 50 nanometers in another aspect, 50 to 100 nanometers in another aspect, or 100-200 nanometers in another aspect. For example VL1-VL2 and VL1-VL3 can be between 50 to 100 nanometers.

The vertical lengths VL of steps S can be nanometer sized. For example the vertical length VL of any of the vertical surfaces can be less than about 100 nm in one aspect, less than about 50 nm in another aspect, or less than about 20 nm in another aspect. The vertical lengths VL can be selected or tuned based on the anticipated wavelength of the electromagnetic radiation and/or desired performance characteristics.

The horizontal length of the widest step or outside width of the lowermost pair of steps, shown as SL1 in FIG. 14, can be approximately the width (see RW in FIG. 18) of the resist feature used to form the step S. Resist features for presently manufactured wire grid polarizers for visible light typically have a width of about 50-100 nm. Accordingly, the outside width SL1, and thus a distance between the outermost coatings on a step, can be less than about 100 nm in one aspect, less than about 75 nm in another aspect, less than about 50 nm in another aspect, or 50-100 nm in another aspect. Again, the width SL1 of the outermost, lowermost pair of steps can be selected or tuned based on the anticipated wavelength of the light and/or desired performance characteristics.

Figure 15:
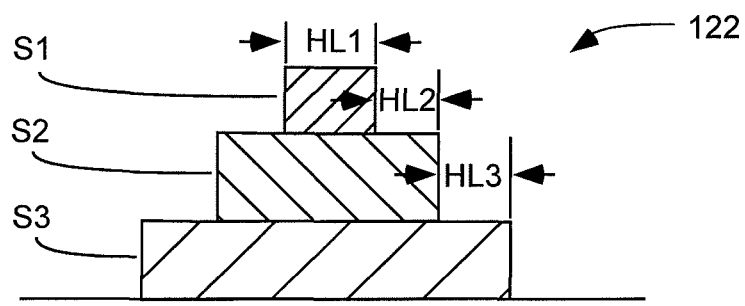
FIG. 15 is a schematic cross-sectional side view of a multi-step wire grid polarizer, in accordance with an embodiment of the present invention.

As shown in FIG. 15, a rib 122 can have a depth or horizontal length HL of the horizontal surface of a step that is the approximate pitch between adjacent coatings. The horizontal length HL of a step can be less than about 50 nm in one aspect, less than about 25 nm in another aspect, or less than about 10 nm in another aspect. A maximum distance between adjacent coatings can be less than about 50 nm and a minimum distance between adjacent coatings can be less than about 20 nm. The horizontal length HL of all steps can be approximately the same. (HL1=HL2=HL3). The horizontal length HL of a step may be different from the horizontal length HL of other steps (HL1≠HL2 or HL1≠HL2 or HL1≠HL2≠HL3). The horizontal length of steps may be adjusted in order to optimize polarization of the desired wavelengths.

Figure 16:
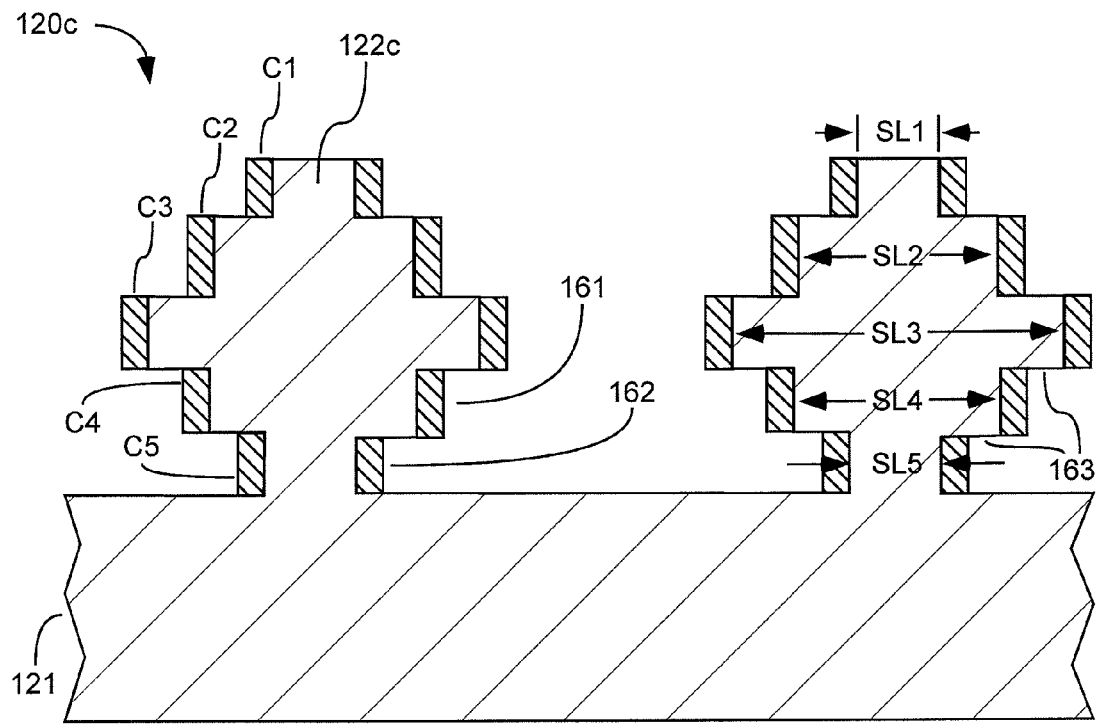
FIG. 16 is a schematic cross-sectional side view of a multi-step wire grid polarizer, in accordance with an embodiment of the present invention.

The embodiments shown in FIGS. 12 & 13 have a step with the longest step length SL as the lowest step or the step closest to the base. As shown in FIG. 16, a step, of a device 120c or rib 122c, with the longest step length SL3 can be an intermediate step and a step with a shorter step length SL5 can be the lowest step or the step closest to the base.

Also as shown in FIG. 16, the steps need not form a pyramid shape but rather the steps in the ribs can become wider or narrower moving from the outermost rib towards the base. The upper step can have the shortest step length or another step can have the shortest step length depending on the isotropic nature of each successive etch as described below. This embodiment may be useful for optimizing polarization of certain selected wavelengths.

Figure 17:
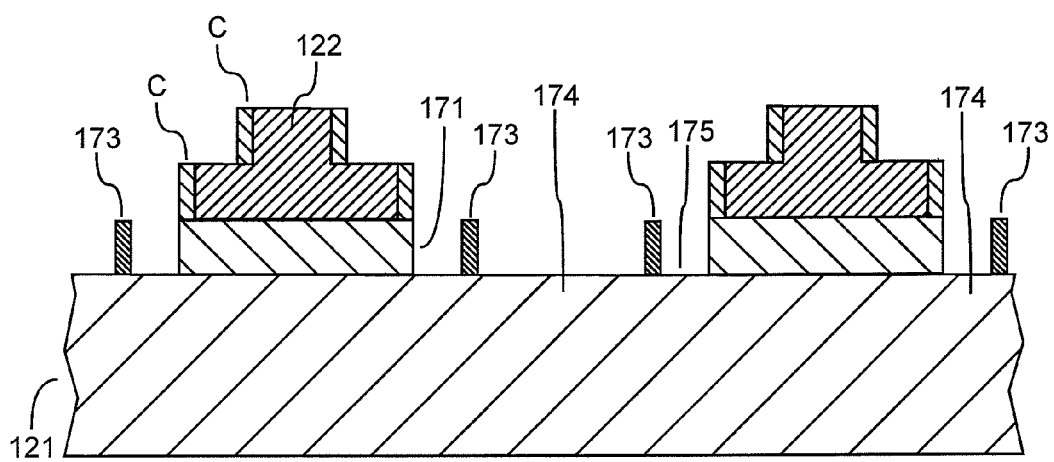
FIG. 17 is a schematic cross-sectional side view of a multi-step wire grid polarizer, in accordance with an embodiment of the present invention.

As shown in FIG. 17, wires 173 of polarizer 120d may be disposed on the base 121, physically separate from the multi-step ribs 122, substantially parallel with the multi-step ribs 122, and located between adjacent multi-step ribs 122. Coating C can be a dielectric or metal. Wires 173 can be dielectric or metal. Wires 173 can be a different material than coating C. This allows use of polarizing ribs made of different materials. This can be beneficial for tuning the polarizer to multiple different wavelengths of electromagnetic radiation.

Multi-Step Wire Grid Polarizer—How to Make

A base 121 can be prepared with either a single material or with layers of different materials. For example, FIG. 13 shows a base 121 comprised of a substrate 131 and a thin film 132. The ribs 122 can be the same material as the base 121, the same material as the substrate 131, the same material as the thin film 132, or a different material than the base, substrate, or thin film. As shown in FIGS. 14 and 15, the ribs 122 can be made of layers. Each layer can be the same material as another layer or can be a different material than another layer or layers. Each step S can be a different material than another step S. A single step S can be made of multiple layers of different materials. Layers of different materials can be formed by applying thin films on a substrate through processes such as chemical vapor deposition (CVD) or physical vapor deposition (PVD).

Figure 18:
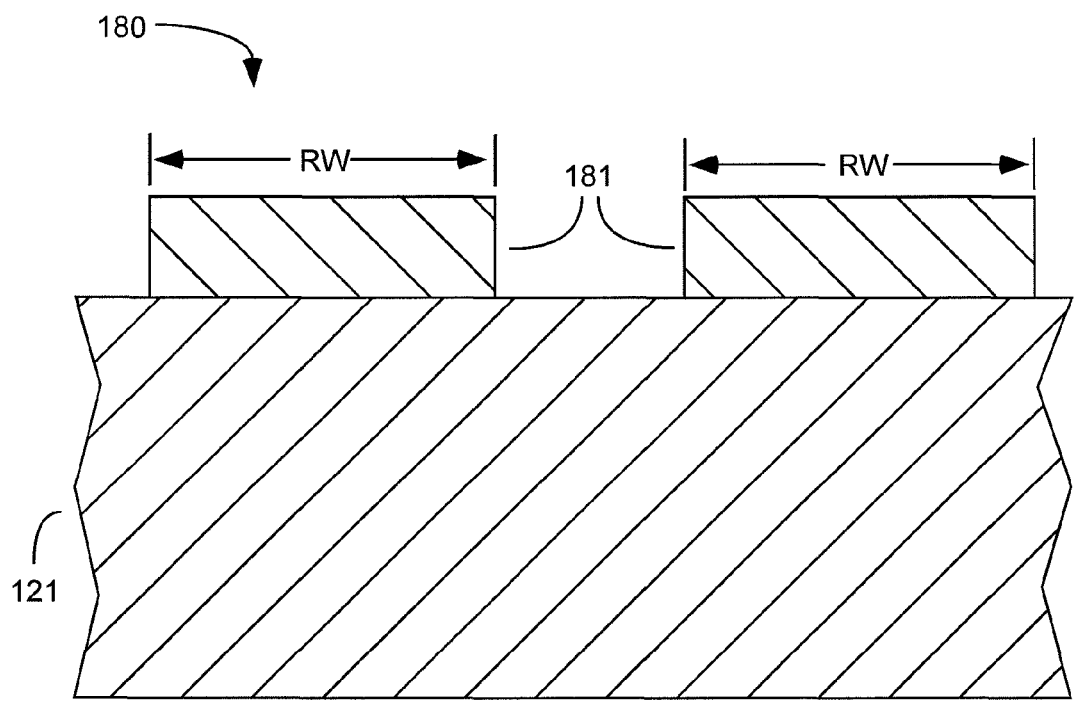
FIG. 18 is a schematic cross-sectional side view showing one step in the manufacture of a multi-step wire grid polarizer, in accordance with an embodiment of the present invention.
Figure 19:
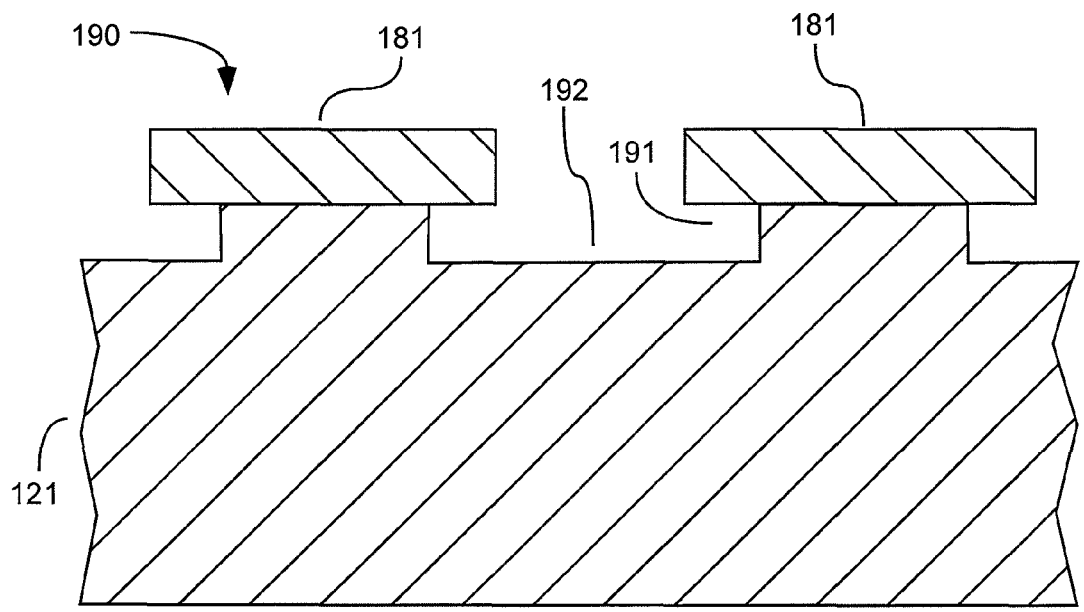
FIG. 19 is a schematic cross-sectional side view showing one step in the manufacture of a multi-step wire grid polarizer, in accordance with an embodiment of the present invention.
Figure 20:
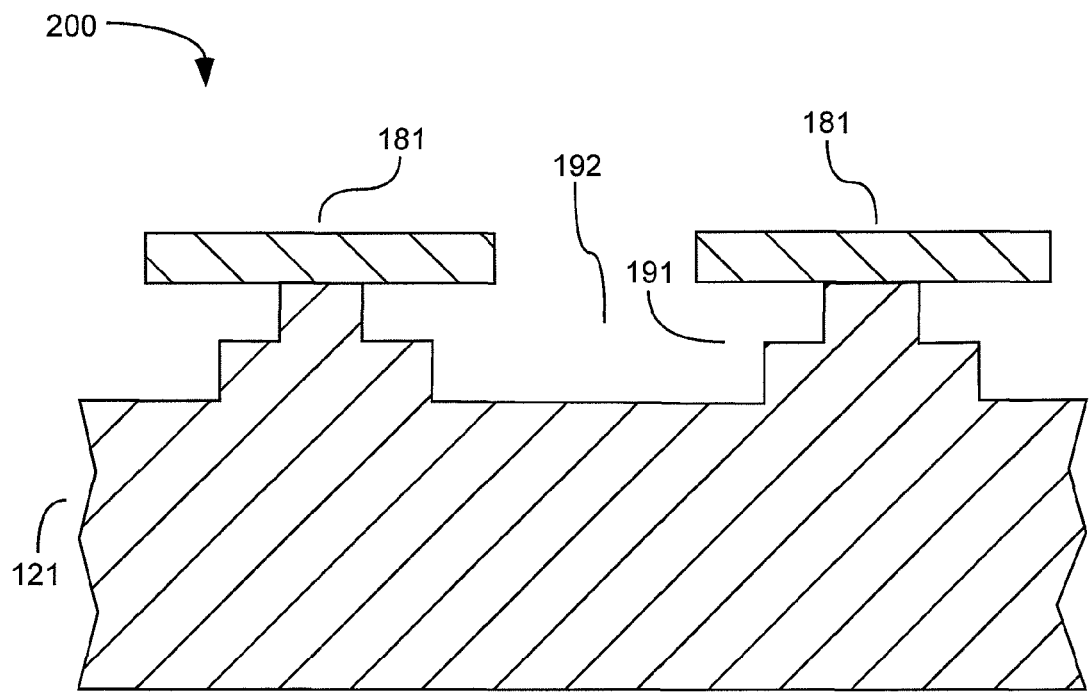
FIG. 20 is a schematic cross-sectional side view showing one step in the manufacture of a multi-step wire grid polarizer, in accordance with an embodiment of the present invention.
Figure 21:
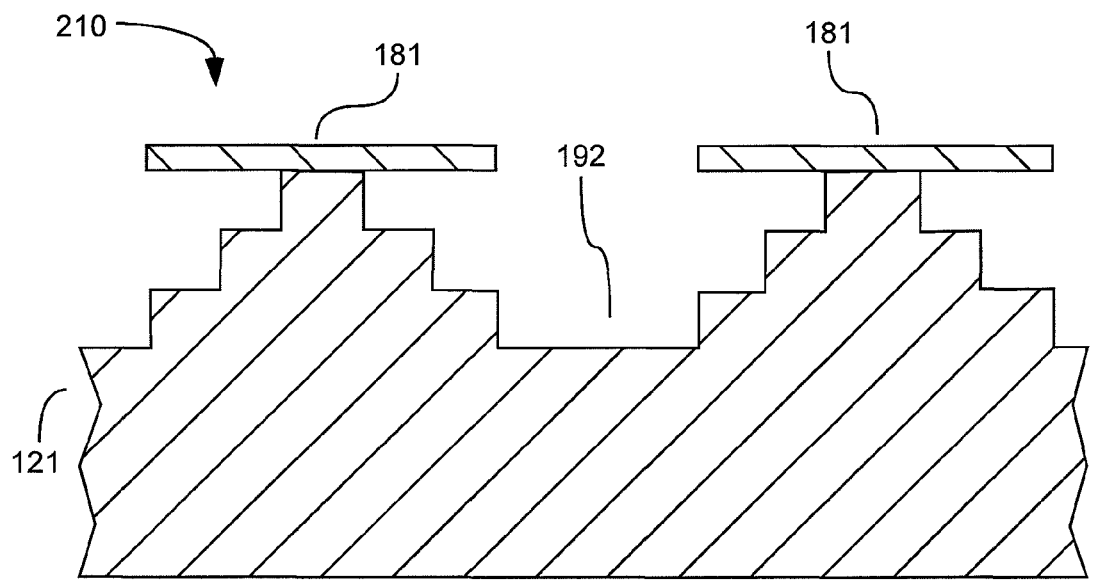
FIG. 21 is a schematic cross-sectional side view showing one step in the manufacture of a multi-step wire grid polarizer, in accordance with an embodiment of the present invention.

The ribs 122 can be formed by depositing a material on a base 121 or by ion milling into the base 121. The ribs 122 may also be formed in the base 121 by etching the base as shown in FIGS. 18-21. For purposes of the description of FIGS. 18-21, the term "base" can include a single material or layers of multiple materials. A resist 181 may be applied to the base 121 and the resist 181 may be patterned to create resist widths RW, as shown in FIG. 18. As shown in FIG. 19, an isotropic etch can etch both vertically into the base laterally outside the resist 192 and horizontally under the resist 191. At least one additional isotropic etch, that is more or less isotropic than the previous isotropic etch, may be performed. For example, as shown in FIG. 20, a second isotropic etch, which is less isotropic in nature than that shown in FIG. 19, is performed to etch both vertically into the base laterally outside the resist 192 and horizontally under the resist 191. Each successive etch that that is either more or less isotropic than the previous etch can result in formation of an additional step. As shown in FIG. 21, an anisotropic etch may be used to etch into the base laterally outside the resist 192 and to remove the resist 181. The anisotropic etch can be used to create a step having a step length SL that is about the same as the width of the resist RW.

Step horizontal length HL and step vertical length VL can be controlled during step formation by the nature of the isotropic etches performed. A more isotropic etch can create a longer horizontal length HL for a step. A longer etch time can create a longer vertical step length VL.

Figure 22:
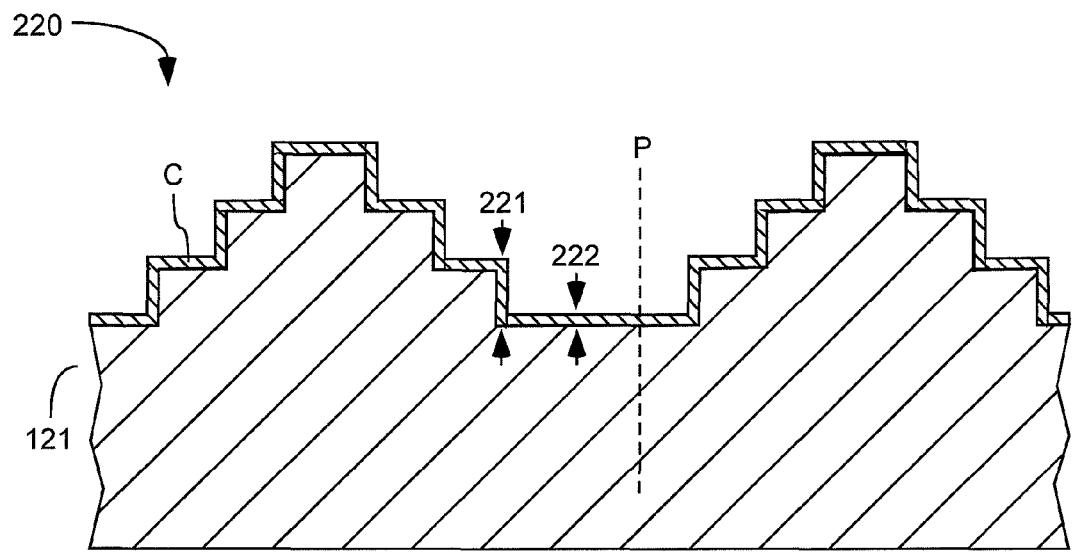
FIG. 22 is a schematic cross-sectional side view showing one step in the manufacture of a multi-step wire grid polarizer, in accordance with an embodiment of the present invention.

After the ribs have been created, the resist can be removed and the surface of the structure may be coated with a coating C, as shown in FIG. 22. The coating may be conformal, non-conformal, segmented, atomic layer deposition, spin on, or etch redeposition. The coating may then be anisotropically etched to substantially remove the coating from horizontal surfaces while leaving a majority of the coating on vertical surfaces. The coating is removed from horizontal surfaces in the anisotropic etch, while leaving a substantial portion of the coating on the vertical surfaces, because a thickness of the coating 222 on the horizontal surfaces, in a direction perpendicular to the main plane of the base, as shown by dashed line P, is less than a thickness of the coating 221 on the vertical surfaces, along this same direction P.

To form a structure as shown in FIG. 16, following the previously described anisotropic etch step to etch primarily in the area outside the width of the resist 192, additional isotropic etches 161 and 162 may be performed. Various combinations of isotropic and anisotropic etches may be performed to create ribs of various shapes. After forming the ribs, a coating is applied and etched as described above. Etching of the coating can also remove coating along horizontal surfaces 163 that are between the multi-step rib 122c and the base 121 by use of a high bias etch.

Figure 23:
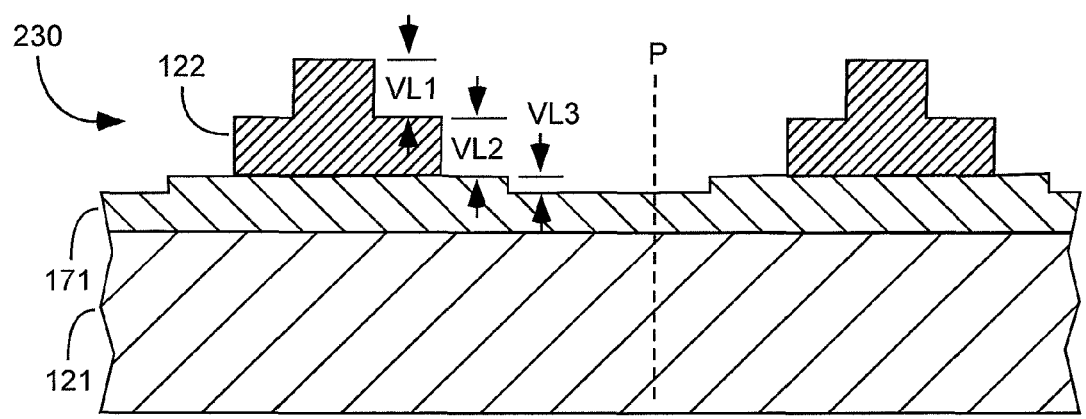
FIG. 23 is a schematic cross-sectional side view showing one step in the manufacture of multi-step wire grid polarizer, in accordance with an embodiment of the present invention.

FIGS. 23-26 show how to make the polarizer 120d of FIG. 17, which includes additional wires 173 in addition to coating C on multi-step ribs 122. As shown in FIG. 23, a thin first layer 171 can be disposed on a base 121. The material of this first layer 171 can be the desired material of the final wires 173, such as metal for example. A second layer can be applied over the first layer 171. The second layer can be the desired material of the multi-stepped ribs 122, such as an oxide or dielectric for example. Multi-stepped rib structures 122 can then be formed as described above. The thickness of the second layer and the duration of the isotropic etch can be timed such that the etch steps forming the multi-stepped ribs 122 end the surface of the first layer 171. The final anisotropic step can be shortened in time in order to form a small final step. For example, a length of the vertical surface of the upper two steps VL1 and VL2 are significantly longer than a length of the vertical surface VL3 of the lowest step. As a result of the limited length of the vertical surface of the lowest step VL3, a thickness of the coating in a direction perpendicular P to the base is much smaller along the vertical surface of the lowest step than along the vertical surface of upper steps.

Figure 24:
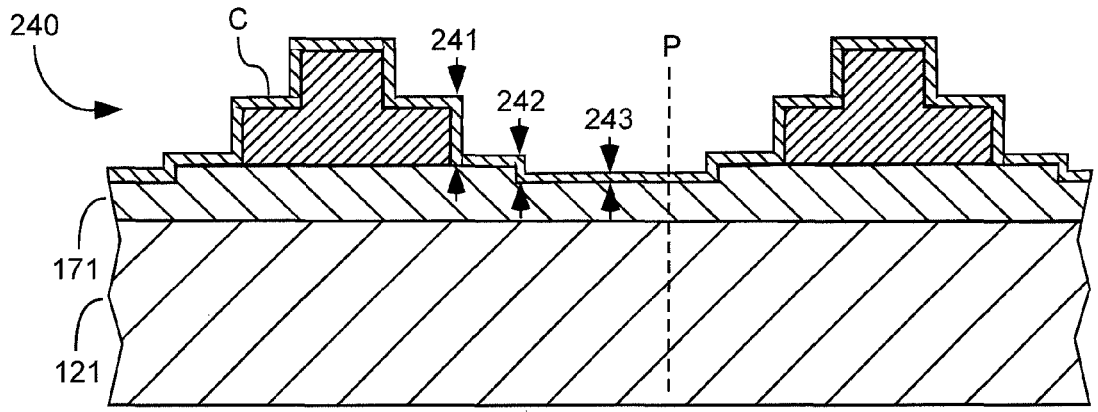
FIG. 24 is a schematic cross-sectional side view showing one step in the manufacture of multi-step wire grid polarizer, in accordance with an embodiment of the present invention.

A coating C can then be applied as described above. As shown in FIG. 24, the coating C thickness along a vertical surface of an upper step 241 can be much longer than the coating thickness along a vertical surface of the lowest step 242. The coating thickness along the lowest step 242 is not very much thicker than the thickness along a horizontal portion of the structure 243.

Figure 25:
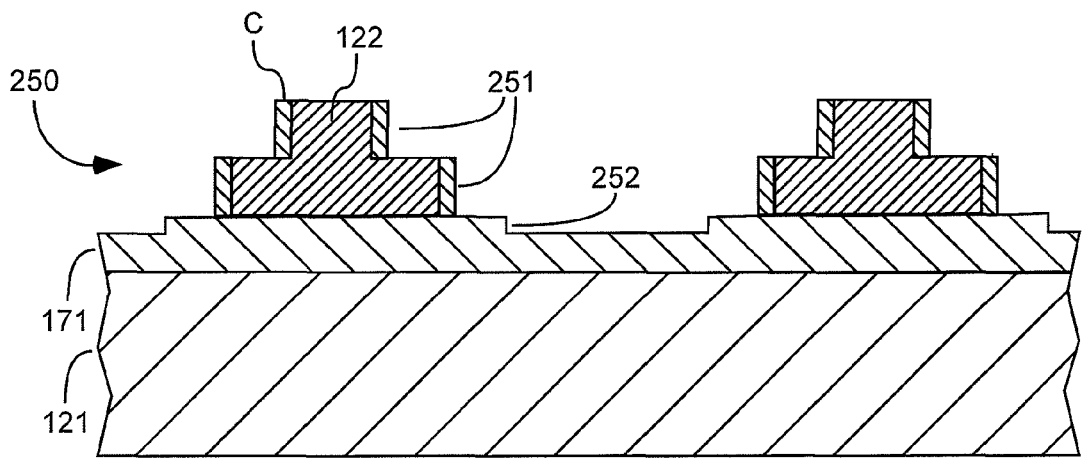
FIG. 25 is a schematic cross-sectional side view showing one step in the manufacture of multi-step wire grid polarizer, in accordance with an embodiment of the present invention.
Figure 26:
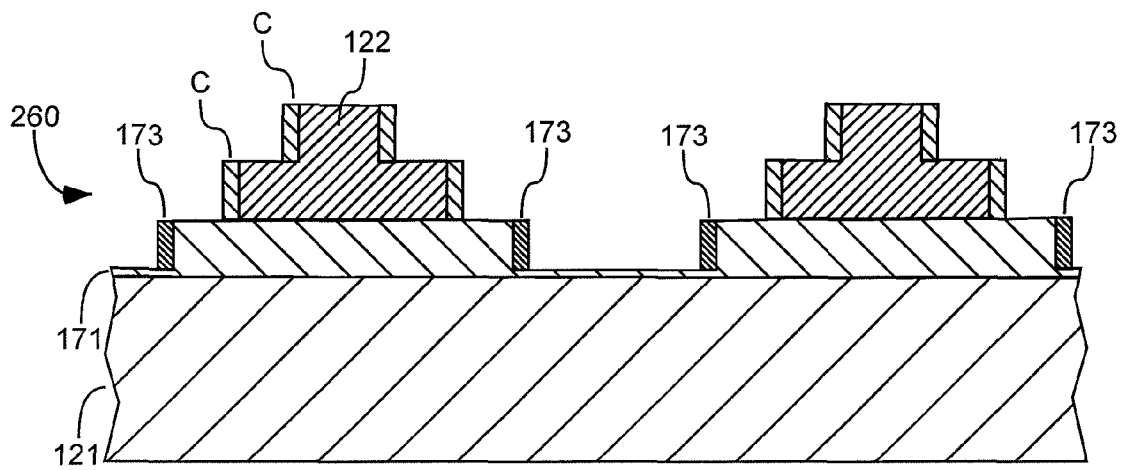
FIG. 26 is a schematic cross-sectional side view showing one step in the manufacture of multi-step wire grid polarizer, in accordance with an embodiment of the present invention.

An anisotropic etch may be performed to remove coating from horizontal surfaces and from the lowest step vertical surface 252. Due to the relatively smaller thickness of coating 242 along the vertical surface of the lowest step, as shown in FIG. 25, the coating can be substantially removed from the vertical surface of this step 252 during this anisotropic etch of the coating while leaving the coating on the vertical surfaces of the upper steps 251.

An anisotropic etch, which is optimized for etch redeposition, may then be performed. The coating C, the second layer or rib 122 material, and the etch must be selected such that primarily the first layer 171 will be etched with minimal etching of the coating C or the ribs 122. The etch can be optimized for etch redeposition by etch chemistry. The anisotropic etch will etch into the first layer 171 and can result in formation of etch redeposition wires 173. The anisotropic etch can continue and thus remove the first layer 171 between 175 the etch redeposition wires 173 and the multi-step ribs 122, as shown in FIG. 17. The anisotropic etch may continue to etch into the base between the ribs 174. The base 121 may thus be etched between 174 the wires 173 and the multi-step ribs 122 to a depth of at least 1 nm.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A polarizer, comprising:
   a. a substrate;
   b. a repeated pattern of groups of parallel, elongated, polarizing wires disposed over the substrate;
   c. each group of wires comprising at least three wires;
   d. a wire at an interior of each group is taller by more than 10 nanometers (nm) than outermost wires of each group; and
   e. a distance between the outermost wires in each group is less than 1 micrometer.

2. The polarizer of claim 1, wherein a wire at an interior of each group is taller by more than 20 nm than outermost wires of each group.

3. The polarizer of claim 1, wherein:
   a. the wire at an interior of each group includes two center wires; and
   b. each group comprises at least four wires.

4. The polarizer of claim 3, wherein the two center wires are approximately equal in height.

5. The polarizer of claim 3, wherein a distance between the two center wires is different than a distance between an outermost wire and an adjacent center wire by more than about 10 nm.

6. The polarizer of claim 1, wherein a minimum distance between adjacent wires is less than 50 nm.

7. The polarizer of claim 1, wherein the distance between the outermost wires in each group is less than 150 nm.

8. The polarizer of claim 1, wherein a width of the wires is less than 20 nm.

9. The polarizer of claim 1, wherein a minimum pitch of adjacent wires is less than 50 nm.

10. The polarizer of claim 1, wherein the wires are etch redeposition wires and comprise a material that is a byproduct of an etch reaction.

11. The polarizer of claim 1, wherein a wire width of one wire differs from a wire width of an adjacent wire by more than 20 nm.

12. A polarizer, comprising:
   a. a substrate;
   b. a repeated pattern of groups of parallel, elongated, polarizing wires disposed over the substrate;
   c. the polarizing wires are etch redeposition wires, comprising a material that is a byproduct of an etch reaction;
   d. the wire at an interior of each group includes two center wires that are approximately equal in height;
   e. each group comprises at least four wires;
   f. the two center wires are taller by more than 10 nanometers than outermost wires of each group.

13. The polarizer of claim 12, wherein a minimum distance between adjacent wires is less than 50 nanometers.

14. The polarizer of claim 12, wherein a distance between the two center wires is different than a distance between an outermost wire and an adjacent center wire by more than about 10 nanometers.

15. The polarizer of claim 12, wherein a width of the wires is less than 20 nanometers.

16. A method for making a polarizer, the method comprising:
   a. applying a resist over a base;
   b. patterning the resist and creating resist widths;
   c. performing an isotropic etch of the base and etching both vertically into the base laterally outside the resist and horizontally under the resist leaving a stem, having vertical sidewalls, under the resist;
   d. allowing etch redeposition along the vertical sidewalls of the stem creating etch redeposition polarizing wires as a byproduct of an etch reaction;
   e. performing an anisotropic etch and etching vertically into the base outside the resist leaving a bottom step, having vertical sidewalls, in the base;
   f. allowing etch redeposition along the vertical sidewalls of the bottom step and creating etch redeposition polarizing wires as a byproduct of an etch reaction.

17. The method of claim 16, further comprising etching to remove the resist, substantially removing the base between the wires, and leaving at least three separate polarizing etch redeposition wires for every original resist width.

18. The method of claim 16, wherein the resist widths are less than 100 nm.

19. The method of claim 16, wherein the wires comprise of a material selected from the group consisting of metal oxide, metal alloy, metal halide, metal carbide, organometallic, and combinations thereof.

* * * * *